(12) United States Patent  
Chou

(10) Patent No.: US 8,564,541 B2  
(45) Date of Patent: Oct. 22, 2013

(54) ZHUYIN INPUT INTERFACE ON A DEVICE

(75) Inventor: Chia-Chi Chou, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 1083 days.

(21) Appl. No.: 12/476,121

(22) Filed: Jun. 1, 2009

(65) Prior Publication Data

US 2010/0231523 A1    Sep. 16, 2010

Related U.S. Application Data

(60) Provisional application No. 61/160,655, filed on Mar. 16, 2009, provisional application No. 61/170,580, filed on Apr. 17, 2009.

(51) Int. Cl.  
*G06F 3/041* (2006.01)

(52) U.S. Cl.  
USPC .......................................... 345/171; 345/173

(58) Field of Classification Search  
USPC ................. 345/168, 169, 171–173; 715/773; 341/22–34  
See application file for complete search history.

(56) References Cited

U.S. PATENT DOCUMENTS

| | | | |
|---|---|---|---|
| 5,379,057 A | 1/1995 | Clough et al. | |
| 5,535,119 A | 7/1996 | Ito et al. | |
| 5,675,362 A | 10/1997 | Clough et al. | |
| 5,959,629 A | 9/1999 | Masui | |
| 6,115,053 A | 9/2000 | Perlin | |
| 6,278,968 B1 | 8/2001 | Franz et al. | |
| 6,323,846 B1 | 11/2001 | Westerman et al. | |
| 6,570,557 B1 | 5/2003 | Westerman et al. | |
| 6,661,409 B2 | 12/2003 | Demartines et al. | |
| 6,677,932 B1 | 1/2004 | Westerman | |
| 6,766,179 B1 | 7/2004 | Shiau et al. | |
| 6,888,536 B2 | 5/2005 | Westerman et al. | |

(Continued)

FOREIGN PATENT DOCUMENTS

| | | |
|---|---|---|
| CN | 1949158 | 4/2007 |
| EP | 1 698 982 | 9/2006 |

(Continued)

OTHER PUBLICATIONS

T. Masui, "An Efficient Text Input Method for Pen-based Computers," Proceedings of the ACM Conference on Human Factors in Computing System (CHI '98), Apr. 1998, ACM press, pp. 328-335.

(Continued)

*Primary Examiner* — Regina Liang  
(74) *Attorney, Agent, or Firm* — Morgan, Lewis & Bockius LLP

(57) ABSTRACT

One of a pair of alternate key planes of a virtual keyboard is presented. Each key plane includes a partial set of phonetic symbols from a phonetic alphabet. A first key plane includes a set of initial phonetic symbols. A second key plane includes a set of final phonetic symbols and a set of tone marks. The virtual keyboard automatically switches between the first key plane and the second key plane upon receiving a predetermined set of user input triggers. A sequence of Zhuyin phonetic symbol input is received from a user interface, where the sequence of Zhuyin phonetic symbols represents phonetic spellings of a plurality of Chinese characters. User input to select one of a list of Chinese character combinations is received. The selected Chinese character combination is entered as text input in the user interface.

41 Claims, 16 Drawing Sheets

(56) References Cited

U.S. PATENT DOCUMENTS

| | | |
|---|---|---|
| 7,030,863 B2 | 4/2006 | Longe et al. |
| 7,096,432 B2 | 8/2006 | Huapaya et al. |
| 7,147,562 B2 | 12/2006 | Ohara et al. |
| 2002/0167545 A1 | 11/2002 | Kang et al. |
| 2002/0168107 A1 | 11/2002 | Tang et al. |
| 2003/0160817 A1 | 8/2003 | Ishida et al. |
| 2003/0216913 A1 | 11/2003 | Keely |
| 2004/0140956 A1 | 7/2004 | Kushler et al. |
| 2004/0230912 A1 | 11/2004 | Clow et al. |
| 2005/0024341 A1 | 2/2005 | Gillespie et al. |
| 2005/0057512 A1 * | 3/2005 | Du et al. ............... 345/168 |
| 2005/0099408 A1 | 5/2005 | Seto et al. |
| 2005/0152600 A1 | 7/2005 | Chen et al. |
| 2005/0174333 A1 | 8/2005 | Robinson et al. |
| 2006/0053387 A1 | 3/2006 | Ording |
| 2006/0085757 A1 | 4/2006 | Andre et al. |
| 2006/0117067 A1 | 6/2006 | Wright et al. |
| 2006/0144211 A1 | 7/2006 | Yoshimoto |
| 2006/0274051 A1 | 12/2006 | Longe et al. |
| 2007/0120822 A1 | 5/2007 | Iso |
| 2008/0030481 A1 | 2/2008 | Gunn et al. |
| 2008/0094356 A1 | 4/2008 | Ording et al. |
| 2008/0180403 A1 * | 7/2008 | Park et al. ............... 345/173 |
| 2009/0037837 A1 | 2/2009 | Raghunath et al. |
| 2009/0058823 A1 | 3/2009 | Kocienda |
| 2009/0077464 A1 | 3/2009 | Goldsmith et al. |
| 2009/0225041 A1 | 9/2009 | Kida et al. |
| 2009/0226091 A1 | 9/2009 | Goldsmith et al. |
| 2009/0265669 A1 | 10/2009 | Kida et al. |

FOREIGN PATENT DOCUMENTS

| | | |
|---|---|---|
| JP | 08-272787 | 10/1996 |
| JP | 10-049272 | 2/1998 |
| JP | 2000-112636 | 4/2000 |
| JP | 2002-108543 | 4/2002 |
| JP | 03-314276 | 8/2002 |
| JP | 2002-0325965 | 11/2002 |
| JP | 2005-092441 | 4/2005 |
| WO | WO 00/74240 | 12/2000 |
| WO | WO 2005/064587 | 7/2005 |
| WO | WO 2007/037809 | 4/2007 |
| WO | WO 2007/047188 | 4/2007 |
| WO | WO 2007/070223 | 6/2007 |
| WO | WO 2009/032483 | 3/2009 |
| WO | WO 2009/111138 | 9/2009 |

OTHER PUBLICATIONS

T. Masui, POBox: "An Efficient Text Input Method for Handheld and Ubiquitous Computers," Proceedings of the Internation Symposium on Handheld and Ubiquitous Computer (HUC '99), Sep. 1999, pp. 289-300.

C. Liu et al., "Online Recognition of Chinese Characters: The State-of-the-Art," IEEE Transactions on Pattern Analysis and Machine Intelligence, vol. 26, No. 2, Feb. 2004, pp. 198-213.

H. Sacher, "Interactions in Chinese: Designing Interfaces for Asian Languages," Interactions Magazine, vol. 5, Issue 5, Sep.-Oct. 1998, pp. 28-38.

International Search Report and Written Opinion, dated Apr. 29, 2009, issued in International Application No. PCT/US2009/033696.

International Search Report and Written Opinion, dated Feb. 18, 2009, issued in International Application No. PCT/US2009/072803.

Invitation to Pay Fees and Partial International Search Report, dated Nov. 11, 2008, issued in International Application No. PCT/US2009/072803.

Kida et al., "Language Input Interface on a Device", U.S. Appl. No. 12/107,711, filed Apr. 22, 2008.

Goldsmith et al., "Identification of Candidate Characters for Text Input", U.S. Appl. No. 12/167,044, filed Jul. 2, 2008.

Authorized officer Philippe Becamel, International Preliminary Report on Patentability in PCT/US2009/033696 mailed Sep. 16, 2010, 7 pages.

International Preliminary Report on Patentability in International Application No. PCT/US2009/072803 mailed Mar. 18, 2010.

Translated First Office Action dated Jul. 29, 2010 issued in Chinese Application No. 200910118235.X, 9 pages.

* cited by examiner

FIG. 3

|  | 302 | 304 | 306 | 308 | 310 | 312 | 314 | 316 | 318 | 320 |
|---|---|---|---|---|---|---|---|---|---|---|
| Labial Initials | ㄅ B | ㄆ P | ㄇ M | ㄈ F |  |  |  |  |  |  |
| Dental Initials | ㄉ D | ㄊ T | ㄋ N | ㄌ L |  |  |  |  |  |  |
| Guttural Initials | ㄍ G | ㄎ K | ㄏ H |  |  |  |  |  |  |  |
| Palatal Initials | ㄐ J | ㄑ Q | ㄒ X |  |  |  |  |  |  |  |
| Retroflex Initials | ㄓ ZH | ㄔ CH | ㄕ SH |  | ㄖ R |  |  |  |  |  |
| Dental Sibilant Initials | ㄗ Z | ㄘ C | ㄙ S |  |  |  |  |  |  |  |
| Medials | ㄧ I, YI | ㄨ U, WU | ㄩ Ü, YU |  |  |  |  |  |  |  |
| Finals | ㄚ A | ㄛ O | ㄜ E | ㄝ E, YE |  |  |  |  |  |  |
|  | ㄞ AI | ㄟ EI | ㄠ AO | ㄡ OU |  |  |  |  |  |  |
|  | ㄢ AN | ㄣ EN | ㄤ ANG | ㄥ ENG | ㄦ ER |  |  |  |  |  |

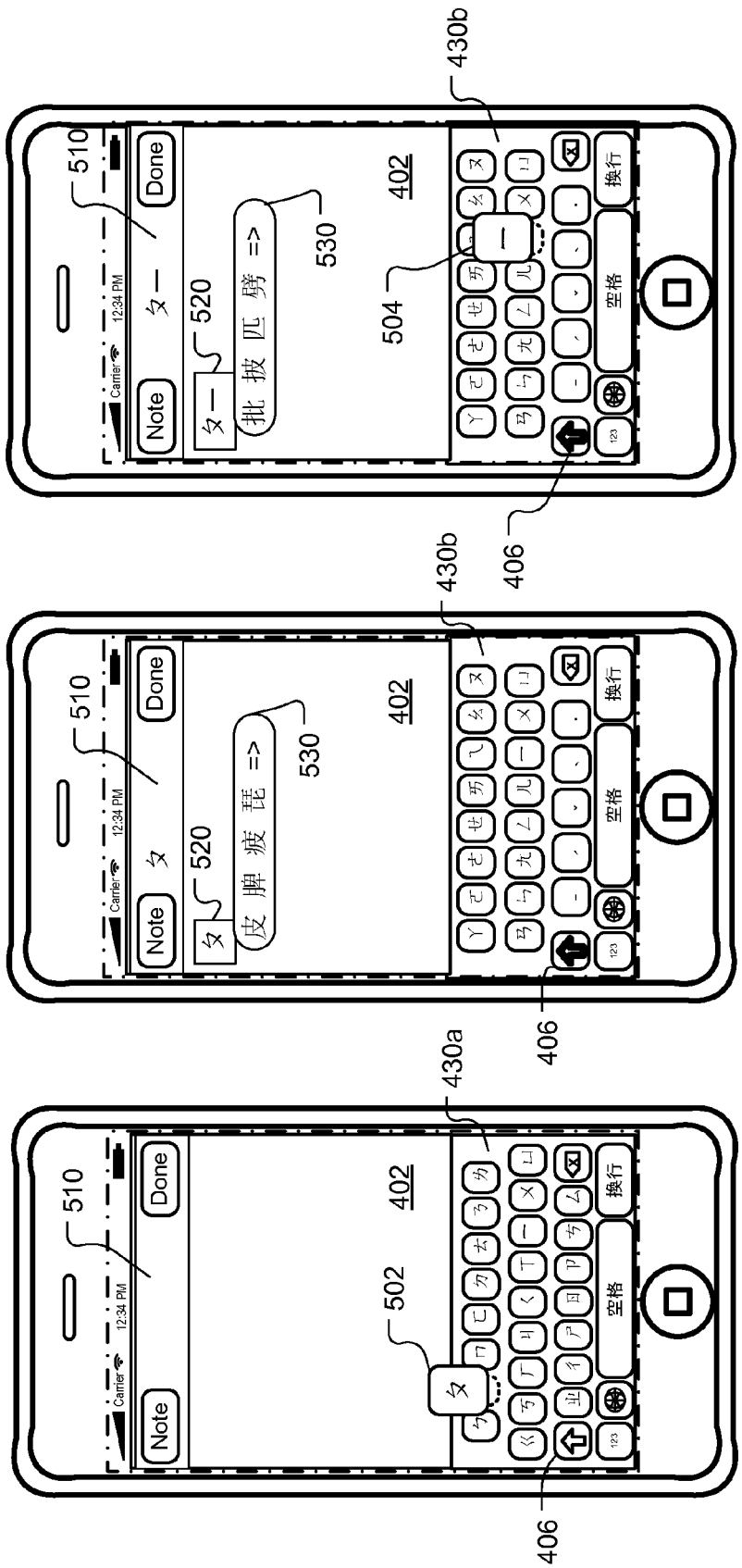

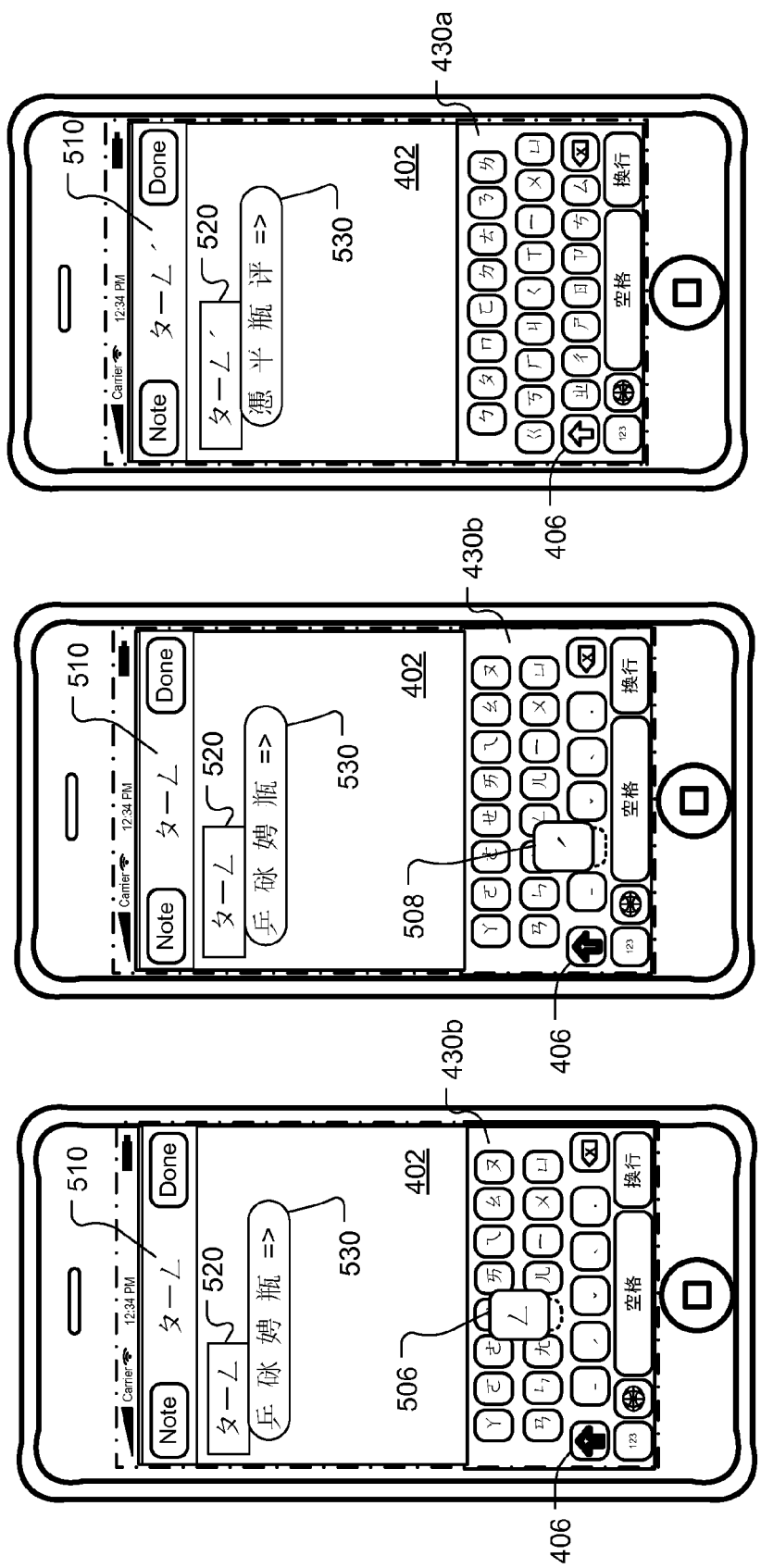

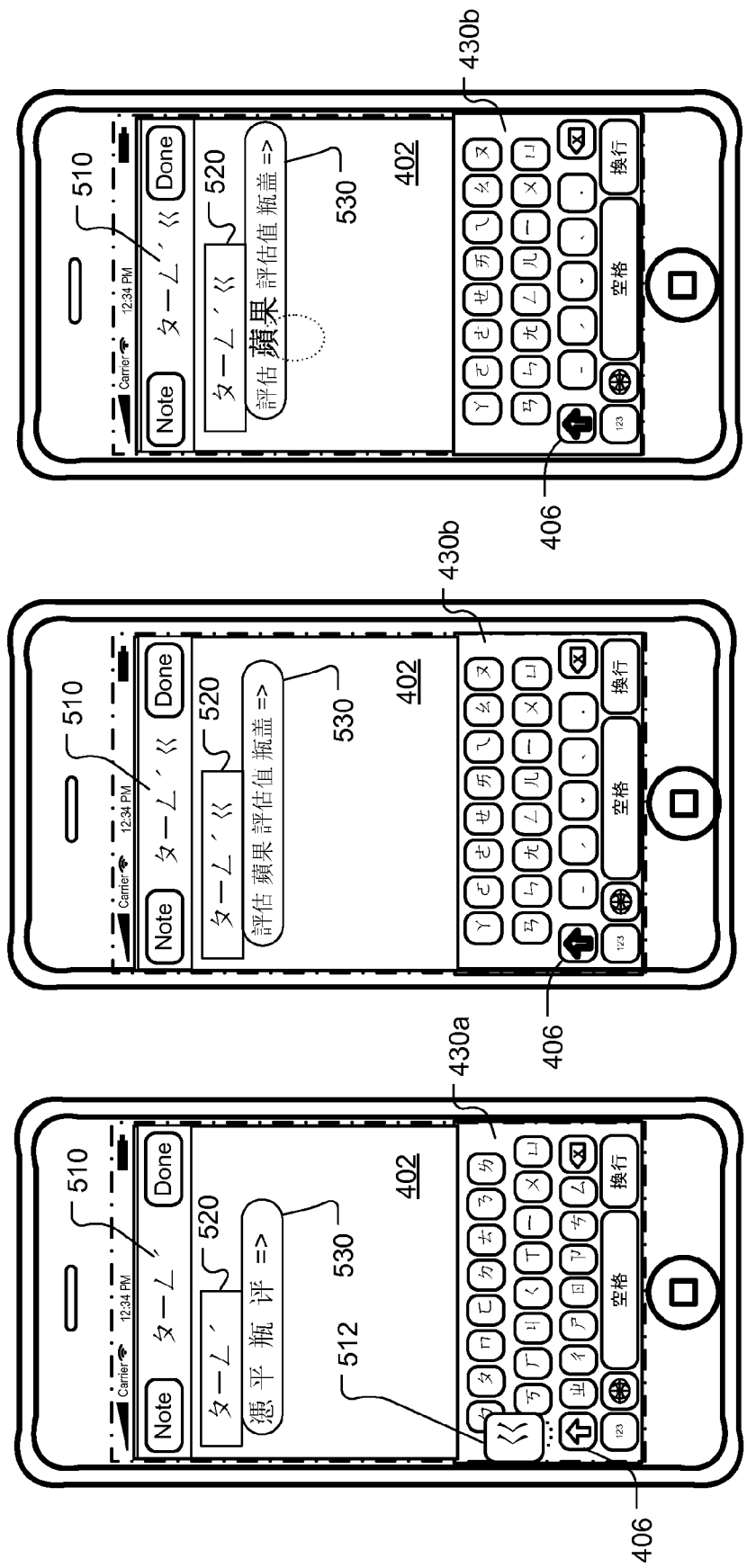

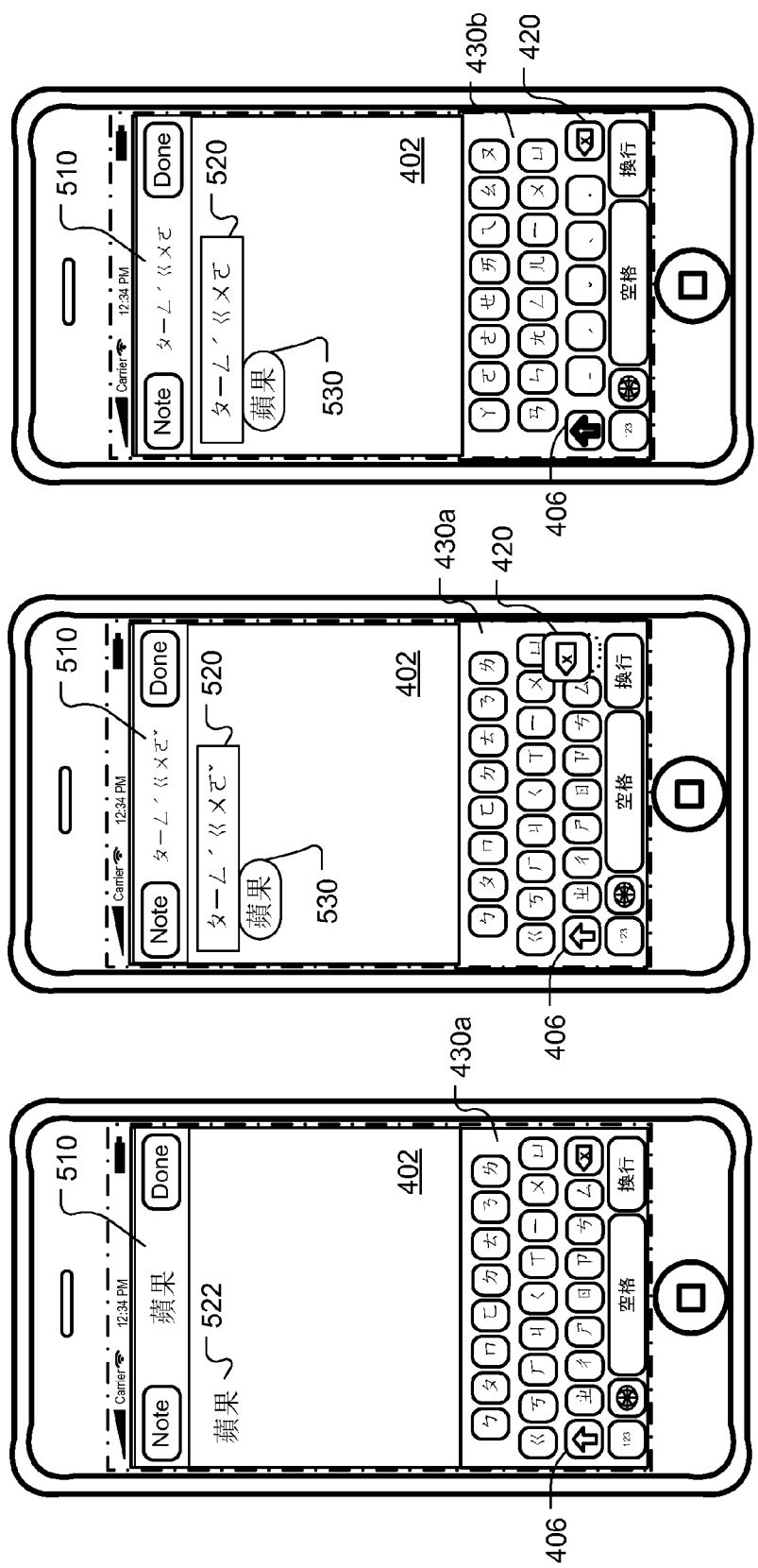

ZHUYIN INPUT INTERFACE ON A DEVICE

CROSS-REFERENCE TO RELATED APPLICATIONS

This application claims the benefit of U.S. Provisional Application Ser. No. 61/160,655, filed on Mar. 16, 2009, and U.S. Provisional Application Ser. No. 61/170,580, filed on Apr. 17, 2009, under 35. U.S.C. §119(e). The entire content of both provisional applications is hereby incorporated by reference.

TECHNICAL FIELD

The subject matter of this specification is generally related to text input interfaces.

BACKGROUND

Traditional computer keyboards may be too large for portable devices, such as mobile phones, multimedia players, or personal digital assistants (PDAs). Some portable devices include a smaller version of the traditional computer keyboard or use a virtual keyboard to receive user input. A virtual keyboard is a software application or a feature of a software application to simulate a computer keyboard. For example, in a portable device with a touch-sensitive display, a user can input text by selecting or touching areas of the touch-sensitive display corresponding to keys of the virtual keyboard.

These smaller keyboards and virtual keyboards may have keys that correspond to multiple characters. For example, a key on the keyboard can correspond to a respective character, such as a letter, in a default input language. The same key may also correspond to one or more additional (i.e., alternative) characters, such as another letter, the letter with an accent option, or another letter in another input language. Due to the physical limitations (e.g., size) of the virtual keyboard on a portable device, a user may find it difficult to enter the alternative characters not readily available on the virtual keyboard.

Input methods for devices having multi-language environments can present unique challenges with respect to text input and correction. The keyboard layout for these input methods may need to be tailored to the selected language to ensure accuracy and efficient workflow.

SUMMARY

Methods, systems, and computer program products, for inputting text are disclosed. In one aspect, an interface for entering electronic text on a touch-sensitive display device is disclosed. The interface includes a virtual keyboard consisting of a first key plane and a second key plane. The first key plane includes a set of initial phonetic symbols of a phonetic alphabet. The second key plane includes a set of final phonetic symbols of the phonetic alphabet. The first key plane and the second key plane are touch-sensitive and operable to receive user input directed toward each of the phonetic symbols to generate electronic text input. The virtual keyboard switches between the first key plane and the second key plane in response to predetermined user input triggers received on the virtual keyboard.

In some implementations, the first key plane further includes a set of medial phonetic symbols of the phonetic alphabet. In some implementations, the second key plane further includes a set of medial phonetic symbols of the phonetic alphabet. In some implementations, the second key plane further includes a set of tone marks associated with the phonetic alphabet. In some implementations, the first and the second key planes both include an identical set of medial phonetic symbols of the phonetic alphabet. In some implementations, the phonetic symbols are Zhuyin symbols of a Chinese Zhuyin alphabet and are arranged in horizontal rows on the first and the second key planes in predetermined phonetic groups of the Chinese Zhuyin alphabet. In some implementations, the first and the second key planes each includes a shift key for switching between the first and the second key planes. In some implementations, the predetermined user input triggers include a user selecting one of the set of initial phonetic symbols of the phonetic alphabet on the first key plane. In some implementations, the predetermined user input triggers include a user selecting one of the set of tone marks associated with the phonetic alphabet on the second key plane. In some implementations, the predetermined user input triggers include a user selecting a shift key on the first or the second key plane that is operable to trigger key plane switching in the virtual keyboard between the first and the second key planes. In some implementations, the predetermined user input triggers include a user deleting a last-entered initial phonetic symbol in a text input stream while the second key plane is being presented. In some implementations, the predetermined user input triggers include a user deleting a last-entered tone mark in a text input stream while the first key plane is being presented.

In another aspect, a computer-implemented method for receiving text-input on a touch-sensitive display device is disclosed. A primary key plane of a virtual keyboard is presented on a touch-sensitive display device. The primary key plane includes a set of initial phonetic symbols of a phonetic alphabet. A first user input selecting one of the set of initial phonetic symbols on the primary key plane is received. Upon the first user input being received, an alternate, secondary key plane of the virtual keyboard is presented in place of (or in addition to) the primary key plane. The secondary key plane includes a set of final phonetic symbols of the phonetic alphabet and none of the set of initial phonetic symbols of the phonetic alphabet.

In some implementations, the secondary key plane further includes a set of tone marks associated with the phonetic alphabet. In some implementations, the primary key plane further includes a set of medial phonetic symbols of the phonetic alphabet. In some implementations, the second key plane further includes a set of medial phonetic symbols of the phonetic alphabet. In some implementations, the first and the second key planes each further includes an identical set of medial phonetic symbols of the phonetic alphabet. In some implementations, the phonetic symbols are Zhuyin symbols of a Chinese Zhuyin alphabet and are arranged in horizontal rows on the first and the second key planes in predetermined phonetic groups of the Chinese Zhuyin alphabet. In some implementations, the primary and the secondary key planes each includes a shift key that is operable to trigger key plane switching in the virtual keyboard between the primary and the secondary key planes when invoked by user input. In some implementations, while presenting the primary key plane of the virtual keyboard, a second user input invoking the shift key on the primary key plane is received. Upon the second user input being received, the secondary key plane of the virtual keyboard is presented in place of the primary key plane. In some implementations, while presenting the secondary key plane of the virtual keyboard, a second user input invoking the shift key on the secondary key plane is received. Upon the second user input being received, the primary key plane of the virtual key board is presented in place of the secondary key plane. In some implementations, a second user input selecting one of the tone marks on the secondary key plane is received. Upon the second user input being received, the primary key plane of the virtual keyboard is presented in place of the secondary key plane. In some implementations, after the second user input is received and while the primary key plane is being presented, a third user input deleting the selected tone mark is received. Upon the third user input being received, the secondary key plane of the virtual key board is presented in place of the primary key plane. In some implementations, while the secondary key plane is being presented, a second user input deleting the selected initial phonetic symbol is received. Upon the second user input being received, the primary key plane of the virtual keyboard is presented in place of the secondary key plane.

In another aspect, a computer-implemented method for receiving text-input on a touch-sensitive display device is disclosed. One of a pair of alternate key planes of a virtual keyboard is presented on the touch-sensitive display device. Each of the pair of alternate key planes includes a partial set of phonetic symbols from a phonetic alphabet. A first key plane of the key plane pair includes a set of initial phonetic symbols of the phonetic alphabet. A second key plane of the key plane pair includes a set of final phonetic symbols of the phonetic alphabet. A sequence of symbol input is received from the pair of alternate key planes for text-entry on the touch-sensitive display device.

In some implementations, the second key plane further includes a set of tone marks associated with the phonetic alphabet. In some implementations, either or both of the first and the second key planes include a set of medial phonetic symbols of the phonetic alphabet.

In some implementations, while the first key plane is being presented, user input adding an initial phonetic symbol or a medial symbol to a symbol input sequence is received. Upon the user input being received, the second key plane of the virtual keyboard is presented in place of the first key plane. In some implementations, while the first key plane is being presented, user input deleting a tone mark from a symbol input sequence is received. Upon the user input being received, the second key plane of the virtual keyboard is presented in place of the first key plane. While the second key plane is being presented, user input is received, where the user input is for adding a tone mark to a symbol input sequence after a medial or a final phonetic symbol. Upon the user input being received, the first key plane of the virtual keyboard is presented in place of the second key plane. While the second key plane is being presented, user input deleting an initial phonetic symbol from a symbol input sequence is received. Upon the user input being received, the first key plane of the virtual keyboard is presented in place of the second key plane.

In one aspect, a computer-implemented method for receiving text-input on a touch-sensitive display device is disclosed. A sequence of Zhuyin symbols is received from a user interface, where the sequence of Zhuyin symbols represents phonetic spellings of a plurality of Chinese characters. A list of Chinese character combinations are presented corresponding to the sequence of Zhuyin symbols. User input to select one of the list of Chinese character combinations is received. The selected Chinese character combination is entered as text input in the user interface.

In some implementations, the sequence of Zhuyin symbols represents phonetic spellings of the plurality of Chinese characters without corresponding tone marks for all of the plurality of Chinese characters. In some implementations, the sequence of Zhuyin symbols represents phonetic spellings of the plurality of Chinese characters without any corresponding tone marks for any of the plurality of Chinese characters. In some implementations, the sequence of Zhuyin symbols represents phonetic spellings of the plurality of Chinese characters without corresponding final phonetic symbols for all of the plurality of Chinese characters. In some implementations, the sequence of Zhuyin symbols represents phonetic spellings of the plurality of Chinese characters without any corresponding final phonetic symbols for any of the plurality of Chinese characters.

In one aspect, a computer-implemented method for receiving text-input on a touch-sensitive display device is disclosed. One of a pair of alternate key planes of a virtual keyboard is presented. Each of the pair of alternate key planes includes a partial set of phonetic symbols from a phonetic alphabet. A first key plane of the key plane pair includes a set of initial phonetic symbols of the phonetic alphabet. A second key plane of the key plane pair includes a set of final phonetic symbols of the phonetic alphabet. A sequence of phonetic symbols is received through the first key plane and the second key plane, where the virtual keyboard switches from the first key plane to the second key plane in response to entry of an initial phonetic symbol in the sequence, the virtual keyboard switches from the second key plane to the first key plane in response to entry of a final phonetic symbol in the sequence, and the sequence of phonetic symbols represents phonetic spellings of a plurality of Chinese characters without corresponding tone marks. A list of Chinese character combinations corresponding to the sequence of phonetic symbols is presented. User input to select one of the list of Chinese character combinations is received. The selected Chinese character combination is entered as text input in the user interface.

In one aspect, a computer-implemented method for receiving text-input on a touch-sensitive display device is disclosed. One of a pair of alternate key planes of a virtual keyboard is presented. Each of the pair of alternate key planes includes a partial set of phonetic symbols from a phonetic alphabet. A first key plane of the key plane pair includes a set of initial phonetic symbols of the phonetic alphabet. A second key plane of the key plane pair includes a set of final phonetic symbols of the phonetic alphabet. A sequence of phonetic symbol input is received through the first key plane. The sequence of phonetic symbols represents phonetic spellings of a plurality of Chinese characters without corresponding final phonetic symbols and tone marks. A list of Chinese character combinations corresponding to the sequence of phonetic symbols is presented. User input to select one of the list of Chinese character combinations is received. The selected Chinese character combination is entered as text input in the user interface.

Other embodiments of the disclosed aspects of the subject matter in this specification include corresponding systems, apparatus, devices, computer program products, and computer readable media.

Particular embodiments of the subject matter described in this specification can be implemented to realize one or more of the following advantages.

In some implementations, the virtual keyboard can include two alternate key planes. Each key plane includes only a subset (i.e., a partial set) of character input symbols. Therefore, fewer character input symbols are displayed on the user interface at a time, avoiding an overcrowded text input interface and making it easier for users to locate and enter desired input symbols on the text input interface.

In some implementations, the character input symbols are arranged in horizontal rows on each of the alternate key planes. The ordering and grouping of the character input symbols on the key planes confirm to predetermined conventional ordering and grouping by which these character input symbols are memorized by users. Therefore, it can be easy and intuitive for a user to locate desired character input symbols on the virtual keyboard. Users can become acquainted with the keyboard layout quickly. Symbols and characters can be input more efficiently using the virtual keypad on a portable device.

In some implementations, the character input symbols of the input language can be divided into two key planes according to the functions of the symbols in constructing a character in the input language. The virtual keyboard can automatically switch between the two key planes depending on the context of the text input. Using the ZhuYin input method for Chinese characters as an example: the first key plane can include only the initial phonetic symbols and the medial phonetic symbols of the input language. The second key plane can include only the final phonetic symbols of the input language and the tone marks associated with the input language. A majority of Chinese character can be constructed by a single initial or medial phonetic symbol, followed by a final phonetic symbol and a tone mark at the end. After an initial phonetic symbol is entered on the first key plane, the virtual keyboard can automatically switch to the second key plane and be ready to receive input entering a final phonetic symbol and a tone mark. After a tone mark is entered (e.g., following a final phonetic symbol) on the second key plane, the virtual keyboard can automatically switch to the first key plane again and be ready to receive user input entering an initial phonetic symbol of the next Chinese character input. The virtual key board can also automatically revert to the previously displayed key plane when the input symbol that triggered the key planed switching is deleted. The context-based switching between the first and the second key planes can make character input more efficient using the virtual keypad on a portable device because users do not have to manually switch between the two key planes in most text entry scenarios. The division of the alphabet onto two key planes and the context-based switching can be applied to other input methods and languages, for example, the Pinyin input method for Chinese characters. Applications suitable for other Asia language input methods can also be implemented, e.g, Jamo (Korean hangul input), Hiragana or Katakana (Japanese input).

In some implementations, the phonetic symbols of the Zhuyin input method can be continuously entered using a keyboard before the Chinese characters represented by the phonetic symbol sequence are entered. Instead of having to enter one character at a time, multiple characters, words, phrases, idioms, partial sentences, and whole sentences can be entered as a single multi-character combination using a single phonetic symbol sequence. Using phonetic symbol sequences for multi-character combinations including multiple characters, words, phrases, idiom, partial sentences, and even whole sentences can improve the accuracy of candidate character suggestion, and reduce the number of possible alternatives in the candidate list. Thus, speed of Chinese character keyboard entry can be improved.

In some implementations, partial phonetic spellings, e.g., a phonetic symbol sequence that does not include complete phonetic spellings of characters, are entered, and character entry can be completed by selection from a candidate list. The candidate list can include character combinations for a single word, words, phrases, partial sentences, and even whole sentences. Using incomplete (or partial) phonetic spellings for character entry, fewer key strokes are required to enter the desired character combinations, words, phrases, idioms, partial sentences, and even whole sentences. The speed and accuracy of character entry can be improved.

In some implementations, the automatic switching keyboard can be extended to enable automatic switching for phonetic spelling without the tone marks. The automatic switching from the second key plane back to the first key plane can be triggered by the entry of a final phonetic symbol. The character combination candidates can be presented for user selection as phonetic symbols are continuously entered into the phonetic symbol sequence through the automatic switching keyboard.

In some implementations, only the first key plane is displayed, and the automatic switching is disabled. A user can continuously enter the initial phonetic symbols to create a sequence of phonetic symbols that can be used to provide candidate suggestions. A user can selectively enter a final phonetic symbol into the sequence of phonetic symbols by manually switching to a second key plane. By displaying only a first key plane for text entry, the screen area is conserved. By using only the initial phonetic symbol for character entry, fewer key strokes are required for character entry. Because multiple characters can be entered together as a single multi-character combination, the accuracy of candidate suggestions can be improved. The speed of character entries can also be improved.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a table including Zhuyin symbols of a Zhuyin phonetic alphabet for inputting Chinese characters.

FIGS. 5A-5J illustrate an example process for entering text on the example user interface shown in FIGS. 4A-4B.

FIGS. 6A-6B illustrate an example process for input correction (e.g., deleting a previously entered input symbol) on the example user interface shown in FIGS. 4A-4B.

Like reference numbers and designations in the various drawings indicate like elements.

DETAILED DESCRIPTION

Example Mobile Device

Figure 1:
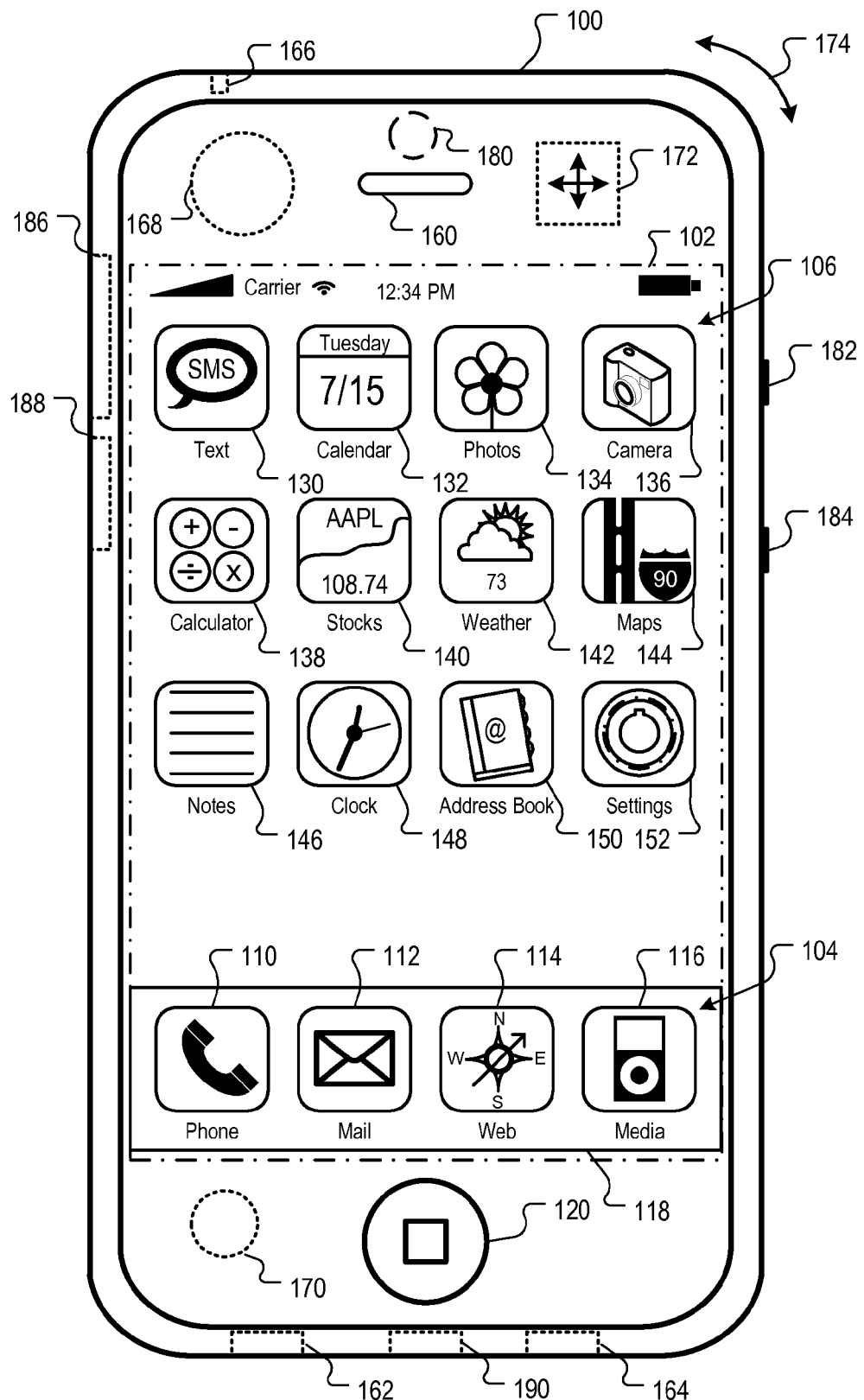
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes touch-sensitive display 102. The touch-sensitive display 102 can implement using liquid crystal display (LCD) technology, light emitting polymer display (LPD) technology, or some other display technology. The touch sensitive display 102 can be sensitive to haptic and/or tactile contact with a user.

In some implementations, the touch-sensitive display 102 can comprise multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by phone object 110; an e-mail device, as indicated by e-mail object 112; a network data communication device, as indicated by Web object 114; a Wi-Fi base station device (not shown); and a media processing device, as indicated by media player object 116. In some implementations, particular display objects 104, e.g., the phone object 110, the e-mail object 112, the Web object 114, and the media player object 116, can be displayed in menu bar 118. In some implementations, device functionalities can be accessed from a top-level graphical user interface, such as the graphical user interface illustrated in FIG. 1. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, the mobile device 100 can be configured as a base station for one or more devices. As such, the mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as short messaging service (SMS) object 130, calendar object 132, photos object 134, camera object 136, calculator object 138, stocks object 140, weather object 142, maps object 144, notes object 146, clock object 148, address book object 150, and settings object 152. Touching the SMS display object 130 can, for example, invoke an SMS messaging environment and supporting functionality; likewise, each selection of the display object 132, 134, 136, 138, 140, 142, 144, 146, 148, 150, and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, speaker 160 and microphone 162 can be included to facilitate voice-enabled functionalities, such as phone and voice mail functions. In some implementations, up/down button 184 for volume control of the speaker 160 and the microphone 162 can be included. The mobile device 100 can also include on/off button 182 for a ring indicator of incoming phone calls. In some implementations, loud speaker 164 can be included to facilitate hands-free voice functionalities, such as speaker phone functions. Audio jack 166 can also be included for use of headphones and/or a microphone.

In some implementations, proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, ambient light sensor 170 can be utilized to facilitate adjusting the brightness of the touch-sensitive display 102. In some implementations, accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, the port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol.

The mobile device 100 can also include camera lens and sensor 180. In some implementations, the camera lens and sensor 180 can be located on the back surface of the mobile device 100. The camera can capture still images and/or video.

The mobile device 100 can also include one or more wireless communication subsystems, such as 802.11b/g communication device 186, and/or Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Mobile Device Architecture

Figure 2:
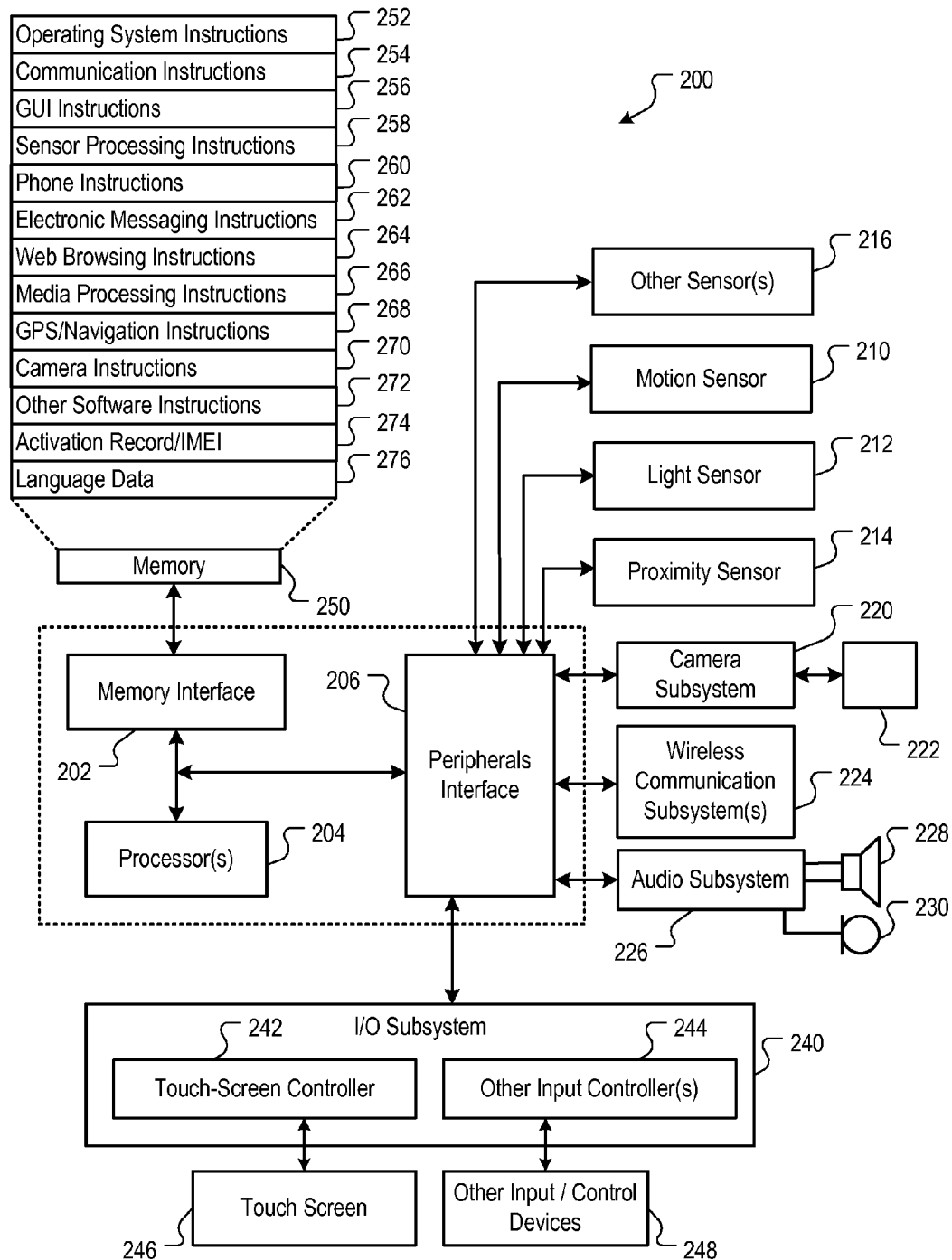
FIG. 2 is a block diagram of an example implementation of the mobile device of FIG. 1.

FIG. 2 is a block diagram 200 of an example implementation of the mobile device 100 of FIG. 1. The mobile device 100 can include memory interface 202, one or more data processors, image processors and/or central processing units 204, and peripherals interface 206. The memory interface 202, the one or more processors 204 and/or the peripherals interface 206 can be separate components or can be integrated in one or more integrated circuits. The various components in the mobile device 100 can be coupled by one or more communication buses or signal lines.

Sensors, devices, and subsystems can be coupled to the peripherals interface 206 to facilitate multiple functionalities. For example, motion sensor 210, light sensor 212, and proximity sensor 214 can be coupled to the peripherals interface 206 to facilitate the orientation, lighting, and proximity functions described with respect to FIG. 1. Other sensors 216 can also be connected to the peripherals interface 206, such as a positioning system (e.g., GPS receiver), a temperature sensor, a biometric sensor, or other sensing device, to facilitate related functionalities.

Camera subsystem 220 and optical sensor 222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile device 100 is intended to operate. For example, the mobile device 100 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 100 may be configured as a base station for other wireless devices.

Audio subsystem 226 can be coupled to speaker 228 and microphone 230 to facilitate voice-enabled functions, such as voice recognition, voice replication, digital recording, and telephony functions.

The I/O subsystem 240 can include touch screen controller 242 and/or other input controller(s) 244. The touch-screen controller 242 can be coupled to touch screen 246. The touch screen 246 and the touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246.

The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230.

In one implementation, a pressing of the button for a first duration may disengage a lock of the touch screen 246; and a pressing of the button for a second duration that is longer than the first duration may turn power to the mobile device 100 on or off. The user may be able to customize a functionality of one or more of the buttons. The touch screen 246 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 30-pin connector that is compatible with the iPod™. Other input/output and control devices can also be used.

The memory interface 202 can be coupled to memory 250. The memory 250 can include high-speed random access memory and/or non-volatile memory, such as one or more magnetic disk storage devices, one or more optical storage devices, and/or flash memory (e.g., NAND, NOR). The memory 250 can store operating system 252, such as Darwin, RTXC, LINUX, UNIX, OS X, WINDOWS, or an embedded operating system such as VxWorks. The operating system 252 may include instructions for handling basic system services and for performing hardware dependent tasks. In some implementations, the operating system 252 can be a kernel (e.g., UNIX kernel).

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/Navigation instructions 268 to facilitate GPS and navigation-related processes and instructions; camera instructions 270 to facilitate camera-related processes and functions; and/or other software instructions 272 to facilitate other processes and functions, e.g., security processes and functions. The memory 250 may also store other software instructions (not shown), such as web video instructions to facilitate web video-related processes and functions; and/or web shopping instructions to facilitate web shopping-related processes and functions. In some implementations, the media processing instructions 266 are divided into audio processing instructions and video processing instructions to facilitate audio processing-related processes and functions and video processing-related processes and functions, respectively. An activation record and International Mobile Equipment Identity (IMEI) 274 or similar hardware identifier can also be stored in memory 250.

Language data 276 can also be stored in memory 250. Language data 276 can include, for example, word dictionaries (i.e., list of possible words in a language) for one or more languages, dictionaries of characters and corresponding phonetics, one or more corpuses of characters and character compounds, and so on.

Each of the above identified instructions and applications can correspond to a set of instructions for performing one or more functions described above. These instructions need not be implemented as separate software programs, procedures, or modules. The memory 250 can include additional instructions or fewer instructions. Furthermore, various functions of the mobile device 100 may be implemented in hardware and/or in software, including in one or more signal processing and/or application specific integrated circuits.

Zhuyin Input Method for Chinese Characters

Zhuyin, also called "Zhuyin Fuhao," "Bopomofo," or "Bopomo," is a phonetic system for transcribing Chinese characters, especially according to the pronunciations in Mandarin. Extensions of the Zhuyin input method are also used in writing or transcribing other Chinese dialects. Zhuyin input method is widely used in Taiwan. Zhuyin input method uses 37 phonetic symbols and 5 tone marks (sometimes only 4 tone marks are used) to represent all possible pronunciations in Mandarin Chinese. Extended Zhuyin input method for Chinese dialects may include additional phonetic symbols and tone marks that represent sounds not present in Mandarin.

The 37 Zhuyin symbols represent a set of initial (or onset) sounds, a set of medial sounds, and a set of final (or rhyme) sounds in Mandarin pronunciation. A majority of Chinese characters are pronounced by a combination of an initial sound and a final sound. An initial sound is analogous to an initial consonant in English pronunciation, such as the "t" in "tea." A final sound is analogous to a vowel or a combination of a vowel and an ending consonant, such as the "ea" in "tea" or the "an" in "tan." Some Chinese characters are pronounced with an additional medial sound between the initial and the final sounds. A medial sound of a Chinese character is analogous to a glide in English pronunciation, such as the "w" in "swan." A small number of Chinese characters require only a medial sound, a final sound, or a combination of a medial and a final sound.

The five tone marks represent the five intonations that a Chinese character can have. Sometimes only four symbols are used to represent the five intonations because the absence of an intonation mark indicates the remaining one of the five intonations (e.g., the first tone).

FIG. 3 is a table of the 37 Zhuyin symbols along with their respective Romanization. The 37 Zhuyin symbols include 21 initial phonetic symbols (groups 302, 304, 306, 308, 310, 312) for the 21 initial (or onset) sounds, 3 medial phonetic symbols (group 314) for the 3 medial (or glide) sounds, and 13 final phonetic symbols (groups 316, 318, 320) for the 13 final (or rhyme) sounds. The initial phonetic symbols include four labial initials (302), four dental initials (304), three guttural initials (306), three palatal initials (308), four retroflex initials (310), and four dental sibilant initials (312). There are three medials (312) in total. The grouping of the final phonetic symbols is less unified in practice. In general, the final phonetic symbols are divided into a group of four (316), four groups of twos, and a group of one (see divisions in rows 318 and 320). The grouping and ordering of the 37 Zhuyin symbols shown in FIG. 3 is widely accepted. They are taught and memorized in Chinese classes, much like how the ABCs are taught in English classes.

Some conventional layouts of Zhuyin symbols and tone marks typically follow a roughly columnar or vertical arrangement. Each group of phonetic symbols runs from the top to the bottom of the keyboard. The groups run from the left to the right side of the keyboard. All of the 37 Zhuyin symbols, 4 tone marks, and various facilitating keys for text input (e.g., space, return, and delete) are typically included in the layout of the keyboard. Sometimes, in order to limit the number of keys present on a layout (e.g., to fit within the screen of a mobile device), some of the keys are used to represent two phonetic symbols. The alternate symbol on a key can be invoked by activating a shift key, for example.

In conventional Chinese character input using the Zhuyin input method, the complete phonetic spelling of each Chinese character must be entered and completed with a tone mark. If no tone mark is entered, it is assumed that the first tone is to be entered. Because each phonetic spelling may correspond to multiple Chinese characters with the same pronunciation, after entering the complete phonetic spelling of each character, the user must stop and select the correct character from a displayed list of suggested character candidates before proceeding to phonetically spell the next character. The conventional method is inflexible in this respect because it requires the user to enter the maximum number of symbols that each character requires (e.g., the complete phonetic spelling of the Chinese character using the Zhuyin symbols), and additional key strokes for scanning through and selecting a correct character candidate from a list of suggested characters before proceeding to spell the next character input.

Text Input Interface

Mobile computing has become a significant part of everyday life. Many people do a significant amount of text editing on their mobile devices, e.g., composing email messages, short text message, and personal notes. The layout of a keyboard for text input can affect the utility of a mobile device in these applications. For input methods that require many symbols, the input keys often crowd the screen, reducing the area for displaying other content (e.g., a webpage in a browser, or a composed message in an email editor) on the screen. Furthermore, the size of the keys is limited by the display size, making input difficult and more error prone. On multi-touch displays, extraneous touching outside of the desired key area can cause false responses and confuse the system. Doubling the functions of a single key (e.g., using a single key for multiple symbols) are sometimes undesirable because switching to an alternate symbol on the keyboard requires an accompanying additional key press.

This specification provides an example dual-plane design of a virtual keyboard that can conserve screen space. In some implementations, the ordering and grouping of keys follow the intuitive ordering and grouping of the input symbols. In some implementations, the layout can avoid using a single key to represent multiple text input symbols. The resulting text input interface is compact, intuitive, efficient, and error-resistant. In some implementations, the design can be further complimented by an automatic switching between the two key planes of the virtual keyboard based on the context of the symbol input or deletion. In some implementations, the design can be further complimented by a capability to accept a continuous sequence of Zhuyin symbol input going beyond the phonetic spelling of a single Chinese character. The sequence of Zhuyin symbols for multiple Chinese characters, phrases, partial sentences, even complete sentences can be continuously input using the keyboard before the corresponding Chinese character combination is selected and entered. In some implementations, abbreviated and/or toneless spellings can be supported by variations of the virtual keyboard to further improve the accuracy and speed of text entry.

Although the layout is described with respect to the Chinese Zhuyin input, the principles adopted by the layout can also be adapted for use with other types of syllabic-based, highly structured languages with alphabet having character groupings including commonly known sets of ordered characters, for example, the Pinyin input method of Chinese characters.

Figures 4A, 4B:
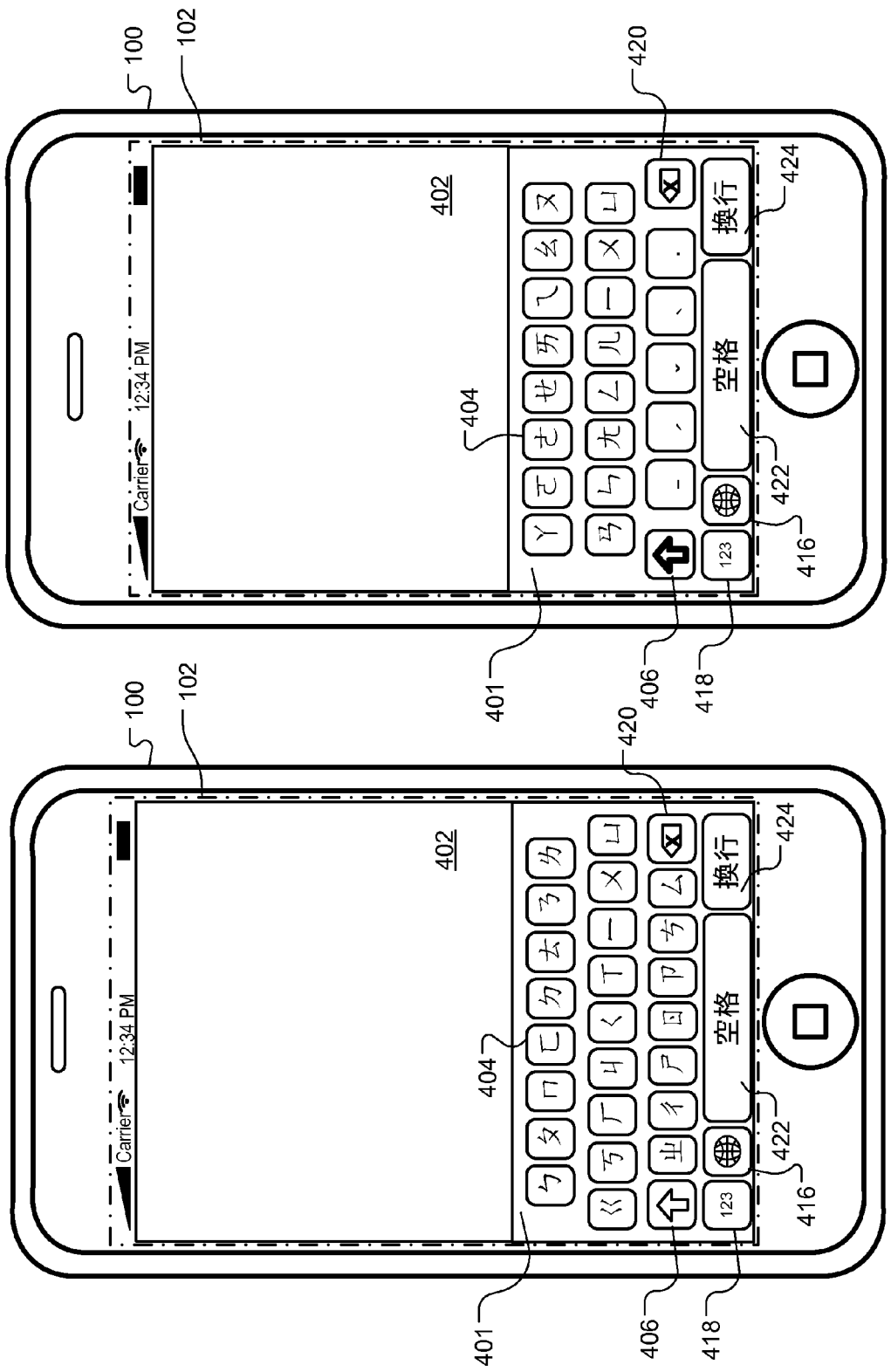
FIGS. 4A-4B illustrate an example user interface for entering text.

FIGS. 4A-4B illustrate an example user interface for inputting or entering text on mobile device 100 in accordance with the technology described in this specification. Mobile device 100 can display text presentation area 402 and text entry area 401 on the touch-sensitive display 102. The text presentation area 402 can be any area where input text can be displayed or presented, e.g., a note-taking application, an email application, and so on. In some implementations, the text presentation area 402 can include one or more text fields (e.g., a text field in a web page). The text entry area 401 can include one or more user interface elements that can be used by a user to enter letters, numbers, symbols, characters, etc. (hereinafter collectively referred to as "characters" for convenience) on the mobile device 100.

The text entry area 401 can be a virtual keyboard. The example virtual keyboard shown in FIG. 4A-4B can include two alternate key planes (shown in FIG. 4A and FIG. 4B respectively). Each of the two alternate key planes can include one or more virtual keys 404 that are each associated with one or more characters (e.g., Zhuyin symbols, punctuations, numbers, etc.). In some implementations, the two alternate key planes each corresponds to a different subset of phonetic symbols of the Zhuyin phonetic alphabet, with no overlapping phonetic symbols or only an overlapping of the medial phonetic symbols.

In some implementations, one of the key planes can be designated the primary key plane (e.g., the key plane shown in FIG. 4A), which is displayed on the virtual keyboard by default. The primary key plane can include at least the set of initial (onset) phonetic symbols of the Zhuyin phonetic alphabet. In some implementations, the primary key plane can also include the set of medial phonetic symbols.

The other key plane can be designated as the secondary key plane (e.g., the key plane shown in FIG. 4B). The secondary key plane can be automatically displayed in place of the primary key plane immediate after a user enters an initial phonetic symbol on the primary key plane. In some implementations, the secondary key plane includes at least the set of final phonetic symbols and the set of tone marks. In some implementations, the secondary key plane can also include the set of medial phonetic symbols. As the secondary key plane is displayed in the virtual key board, a user can enter a final phonetic symbol and a tone mark from the secondary key plane. The primary key plane can be displayed again when the user completes the "phonetic spelling" of a Chinese character by entering the tone mark for the Chinese character on the secondary key plane.

In some implementations, the user interface can also provide a list of suggested candidate characters in the text presentation area 402 based on the sequence of input symbols that has been entered (e.g., the Chinese characters that match the presently entered string of symbols). If the user selects a candidate before completing the "phonetic spelling" of the candidate, the virtual keyboard can also automatically switch to the primary key plane and be ready to receive symbol input for the next Chinese character. In some implementations, the user can complete the phonetic spelling of each character, and select the correct character from the list of candidate characters. In some implementations, the user can continue to enter the phonetic symbols for multiple characters and does not select a candidate after the phonetic spelling for each character is completed. The keyboard can continue to switch between the primary key plane and the secondary key plane as the user continues to enter the phonetic symbols. The list of suggested candidates showing groups or combinations of Chinese characters that match the currently entered sequence of phonetic symbols can be continuously updated and displayed. By entering a sequence of phonetic symbols for multiple characters, the list of suggested candidates can be shortened, and the accuracy of the suggestions can be improved.

The two alternate key planes can be also be switched manually by a user touching shift key 406 on the virtual keyboard. In some implementations, the shift key 406 can have a slightly different look on the two key planes indicating the current switched state of the virtual keyboard. In some implementations, other ways of manually toggling between the two key planes can be implemented (e.g., by a multi-touch gesture on the touch-sensitive display).

The text entry area 401 can include other user interface elements. Examples of these other user interface elements can include input method switching key 416 for switching between input user interfaces for one or more languages (e.g., QWERTY keyboard, handwriting recognition, etc.), number pad key 418 for switching to a keypad for entering numbers and related symbols (e.g., mathematical symbols), delete/backspace key 420 for deleting previously entered symbols, "空格" or "Space" key 422 for accepting the currently activated character in the text input (and optionally inputting a white space), and "换行" or "Return" key 324 for entering line breaks. Other user interface elements can be implemented. For example, the user interface can also include language specific punctuation keys for inputting language-specific punctuation marks. In some implementations, the punctuation symbols can be brought up by invoking the number pad key 418. For another example, the user interface can include a candidate key for bringing up a list of character candidate completions or replacements for the current sequence of input symbols. In some implementations, the candidates can be displayed automatically as the user enters the phonetic symbols into the sequence. For another example, the user interface can also include a key for bringing up a list of other symbols (e.g., the trademark symbol), emoticons (e.g., the smiley face), and the like.

Figure 4C:
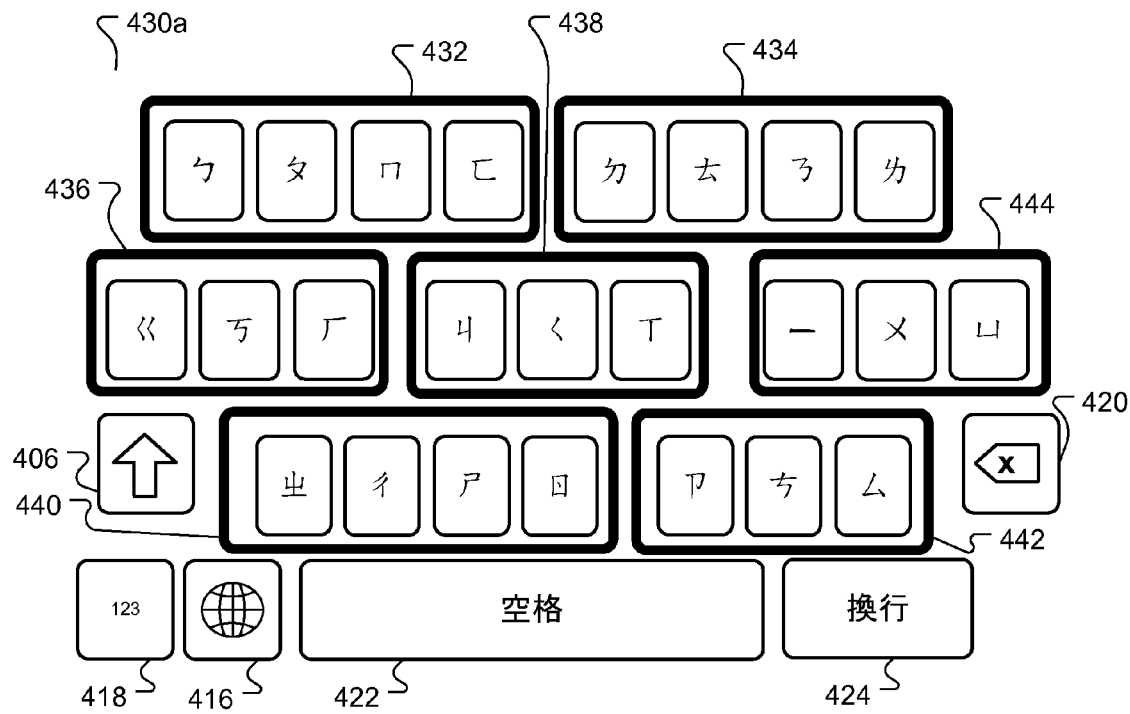
FIGS. 4C-4D illustrate an example layout of input symbols on the two key planes of the example user interface shown in FIGS. 4A-4B.
Figure 4D:
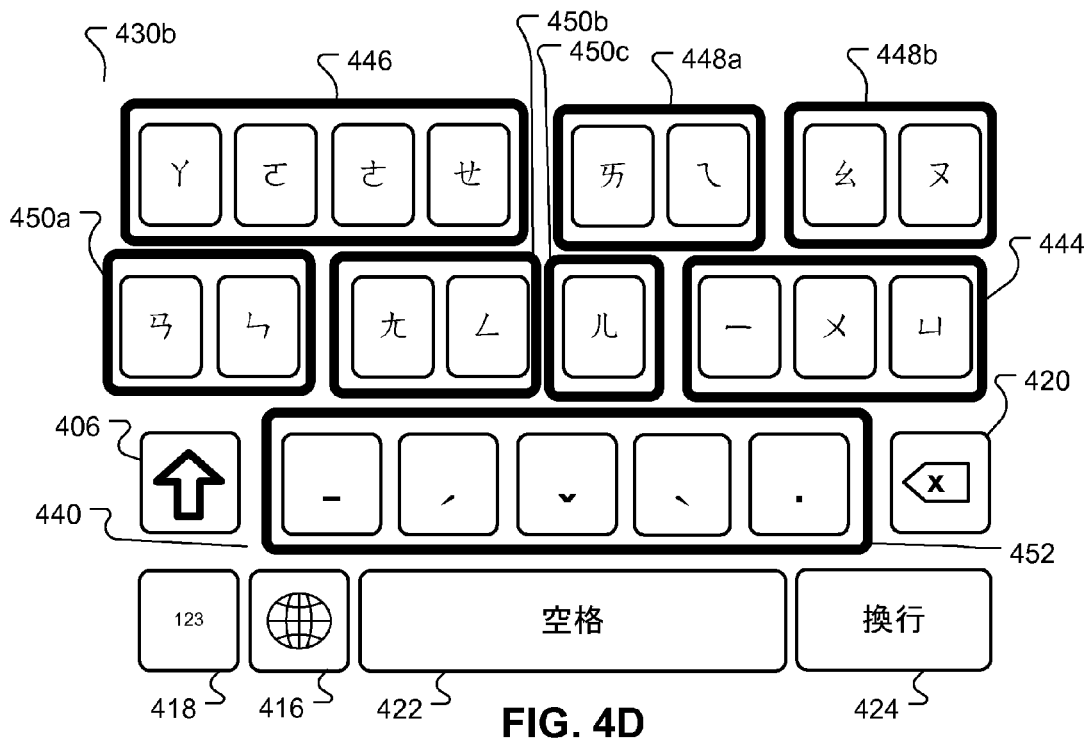

FIGS. 4C-4D show example layouts of the two key planes (430a and 430b) of the virtual keyboard shown in FIGS. 4A-4B.

FIG. 4C shows an example layout of the primary key plane (430a). The example layout of the primary key plane 430a can include the set of initial phonetic symbols of the Zhuyin phonetic alphabet. The set of initial phonetic symbols can be arranged on the primary key plane in horizontal rows (432, 434, 436, 438, 440, and 442). The grouping and ordering of the set of initial phonetic symbols on the primary key plane 430a can follow the conventional ordering and grouping as shown in FIG. 2. This layout makes it easier for users to locate desired input symbols on the virtual keyboard. In some implementations, as shown in FIG. 4C, the primary key plane 430a can also include the set of three medial symbols (444) since some Chinese characters start with a medial sound instead of an initial sound.

In some implementations, when a user enters an initial phonetic symbol on the primary key plane 430a of the virtual key board, the virtual keyboard can automatically switch to the secondary key plane 430b and be ready to receive input of a medial or a final phonetic symbol following the initial phonetic symbol just entered. Since some Chinese characters are "phonetically spelled" by a medial symbol and a final symbol combination, or a medial symbol alone, the virtual keyboard can also automatically switch to the secondary key plane 430b after the user enters a medial symbol on the primary key plane 430a.

In some implementations, the user can toggle between the key plane that is currently displayed and the alternate key plane by pressing a "shift" key 406 on either the primary or the secondary key planes. In some implementations, the shift key 406 can have a slightly different look for the two key planes (see e.g., the "shift" key 406 in FIG. 4C and FIG. 4D) to indicate the current key plane that is being displayed on the virtual key board.

FIG. 4D shows the secondary key plane (430b) of the virtual key board. The secondary key plane 430b includes the set of final phonetic symbols of the Zhuyin phonetic alphabet. In some implementations, the set of final phonetic symbols can be arranged on the secondary key plane in horizontal rows (446, 448a, 448b, 450a, 450b, and 450c). The grouping and ordering of the final phonetic symbols on the secondary key plane follow the conventional ordering and grouping of the Zhuyin phonetic alphabet shown in FIG. 2. This arrangement makes it easy for users to locate desired input symbols on the virtual keyboard. In FIG. 4D, the secondary key plane 330b also includes the set of three medial symbols (444). In some implementations, the set of medial symbols are placed at the same positions as those in the primary key plane, making them easier to locate.

The secondary key plane (430b) shown in FIG. 4D can also include a set of tone marks (452) associated with the Zhuyin input method. In some implementations, all five of the tone marks can be displayed on the secondary key plane 430b, such that the completion of the "phonetic spelling" of any Chinese character can be indicated by the entry of a tone mark following a medial or a final phonetic symbol. After a user has entered an initial phonetic symbol on the primary key plane 430a, the user can enter a medial symbol followed by a tone mark, or a medial symbol followed by a final symbol and a tone mark, to complete the phonetic spelling of a Chinese character on the secondary key plane 430b. After the user enters the tone mark on the secondary key plane 430b of the virtual key board, the virtual keyboard can automatically switch to the primary key plane 430a again and be ready to receive input of an initial symbol for the phonetic spelling of the next Chinese character input.

The primary and the secondary key planes shown in FIGS. 4C and 4D can further include other user interface elements, such as the input method switching key 416, the number pad key 418, the delete/backspace key 420, the "空格" or "Space" key 422, and the "换行" or "Return" key 324 as described with respect to FIGS. 4A-4B. Other user interface elements can also be implemented.

The dual-plane layout of the virtual key board can significantly reduce the size of the text entry area of a text input interface since only a relevant subset (e.g., either the initial phonetic symbols or the final phonetic symbols) of the phonetic alphabet is displayed at a time. The automatic switching between the primary and the secondary key planes based on the context of text input can save the user from having to press an additional key each time he/she wishes to invoke a hidden/alternate key on the virtual keyboard. This design can help avoiding overcrowding of the virtual keyboard. The keys do not have to be squeezed to an inconvenient size to fit on the text entry area of the text input interface. The locations of the symbols are intuitive to users who are familiar with the conventional Zhuyin phonetic alphabet. The medial symbols can appear on both the primary and the secondary key planes, making entry of Chinese characters that start with a medial sound more convenient.

In some implementations, further compaction of the key planes can be achieved. For example, the overlapping medial keys can be omitted from one of the two key planes (e.g., the primary key plane), and users can manually switch to the key plane containing the medial keys as needed. Since the medial phonetic symbols are not frequently used, omission of the medial symbols from one of the key planes may be a desired implementation for many users, especially for devices with particularly small displays. In some implementations, the tone marks can be omitted from the secondary key plane. The users can enter the tone marks by a set of predetermined multi-touch gestures on the touch-sensitive display. For example, each of the tone marks can be entered by the user flicking across the touch-sensitive display in a predetermined direction.

The dual-plane keyboard layout can be implemented for other input methods, such as the Pinyin input method for Chinese characters. Pinyin input method uses Romanization of the initial, medial, and final sounds of Chinese characters to "phonetically spell" Chinese characters. Although a standard English keyboard can be used to enter Pinyin, the dual-plane design shown in FIGS. 4A-4D can be adapted for use with Pinyin as well. In Pinyin, there are special initial symbols for the medial sounds if they are the starting sounds of Chinese characters. Therefore, medial phonetic symbols do not have to appear on the first key plane. Furthermore, tone marks do not have to appear on the second key plane because they can be entered by a multi-touch gesture, for example. Applications in most other Asian languages and input methods are also possible, for example, Jamo (Korean hangul input), Hiragana or Katakana (Japanese input).

Text Input Example

FIGS. 5A-5J illustrate an example process for entering text on the example user interface shown in FIGS. 4A-4B.

The Zhuyin symbols that are entered in the example shown in FIGS. 5A-5J are the "phonetic spellings" for two Chinese characters "蘋果" which means "Apple" in English. The Chinese character "蘋" is "spelled" as "ㄆ ㄧㄥ ˊ", and the Chinese character "果" is "spelled" as "ㄍ ㄨ ㄛ ˇ" according to the Zhuyin input method.

In FIG. 5A, when a text editing application (such as a note application) is started, the primary key plane 430a of the virtual keyboard can be presented first in the text entry area of the text editing application. Before any input is entered in the text entry area, the text presentation area 402 of the text editing application is blank. The text editing application can include a document title area 510, which can optionally display a suggested title of the typed document. In some implementations, the suggested title of the document can be the first word or the first line of the typed document.

In some implementations, the primary key plane 430a can include the set of initial phonetic symbols of the Zhuyin alphabet. In some implementations, the primary key plane 430a can also include the set of medial phonetic symbols of the Zhuyin alphabet. In some implementations, the primary key plane 430a does not include any final phonetic symbols or tone marks. In some implementations, a shift key 406 can be included in the primary key plane 430a. The virtual keyboard can toggle between the primary key plane 430a and the secondary key plane 430b when a user input directed toward the shift key 406 is received on the touch-sensitive display.

First, a user input directed toward the virtual key "ㄆ" 502 of the primary key plane 430a is received on the touch-sensitive surface. Some visual effects can be displayed in the text input area to indicate the receipt of the user input. For example, a pop-up confirmation showing the entered symbol can be displayed, as illustrated in FIG. 5A. Other visual or audio confirmations can also be implemented.

FIG. 5B shows that once the first input symbol (an initial phonetic symbol or a medial phonetic symbol) is received on the primary key plane 430a, the virtual keyboard in the text entry area can automatically switch to the secondary key plane 430b without any further input from the user. The document title area 510 can be updated to reflect the symbol that has just been entered. The text presentation area 402 can be updated to show a text entry box 520. The text entry box 520 shows the initial phonetic symbol "ㄆ" that has just been entered. A candidate suggestion list 530 can be presented near the text entry box 520 showing a list of Chinese characters that are phonetically spelled with an initial phonetic symbol "ㄆ."

In some implementations, the secondary key plane 430b can include the set of final phonetic symbols of the Zhuyin phonetic alphabet. In some implementations, the secondary key plane 430b can also include the set of medial phonetic symbols of the Zhuyin phonetic alphabet. In some implementations, the secondary key plane 430b can also include a set of tone marks associated with the Zhuyin input method. In some implementations, the secondary key plane 430b does not include any initial phonetic symbols of the Zhuyin phonetic alphabet. In some implementations, the secondary key plane does not include any tone marks if the tone marks can be entered by a set of predetermined multi-touch gestures on the touch-sensitive display. When the virtual keyboard displays the secondary key plane 430b, the shift key 406 can show a slight different look from the shift key 406 shown on the primary key plane 430a (e.g., appearing highlighted). A user can touch the shift key 406 on the secondary key plane 430b to manually switch back to the primary key plane 430a.

FIG. 5C shows that an input symbol is received on the secondary key plane 430b of the virtual keyboard. The input symbol entered on the secondary key plane 430b is the medial phonetic symbol " ㄧ " shown on the virtual key 504. The document title area 510, the text input box 520 can be updated to reflect the newly entered phonetic symbol. The candidate suggestion list 530 can also be updated to show a list of Chinese characters that match the present string of phonetic symbols that have been entered.

FIG. 5D shows that another input symbol is received on the secondary key plane 430b of the virtual keyboard. The input symbol entered on the secondary key plane 430b is the final phonetic symbol "ㄥ" shown on the virtual key 506. The document title area 510, the text input box 520, and the suggested candidate list 530 can be updated to reflect the newly entered phonetic symbol.

FIG. 5E shows that another input symbol is received on the secondary key plane 430b of the virtual keyboard. The input symbol entered on the secondary key plane 430b is the tone mark "ˊ" shown on the virtual key 508. The input of the tone mark completes the "phonetic spelling" of the first Chinese character "蘋."

FIG. 5F shows that once the tone mark "ˊ" is received on the secondary key plane 430b, the virtual keyboard in the text entry area can automatically switch to the primary key plane 430a without any further input from the user. The document title area 510, the text input box 520, and the suggested candidate list 530 can be updated to reflect the newly entered tone mark. At this point, conventional Zhuyin input methods would require the user to select a candidate from the list of suggested Chinese characters to complete the entry of one Chinese character before allowing the user to proceed with entering additional phonetic symbols. In the input method described in this specification, such requirement is not necessary. A user can proceed to enter additional phonetic symbols without making a selection of character at this point. Additional phonetic symbols may prompt a more accurate and shortened list of candidate multi-character combinations (e.g., multiple characters, words, phrases, partial sentences, or complete sentences, etc.) that match the currently entered sequence of phonetic symbols and tone mark(s).

FIGS. 5G-5H show continued user input for the next character "果." FIGS. 5G and 5H show that once the initial phonetic symbol "ㄍ" on the virtual key 512 is entered through the primary key plane 430a, the virtual keyboard can automatically switch to the secondary key plane 430b without further input from the user. The document title area 510, the text input box 520, and the suggested candidate list 530 can be updated to reflect the newly entered initial phonetic symbol. At this point, there is sufficient information for the word "蘋果" to show up on the candidate suggestion list 530. FIG. 5I shows that a user can select the word "蘋果" from the candidate suggestion list to complete the text entry of the word without having to complete the "phonetic spelling" of the second character "果."

FIG. 5J shows that once the user input selecting the word "蘋果" from the suggested candidate list 530 is received, the text entry of the word is completed. The word "蘋果" 522 appears in the text presentation area 402 in place of the previously entered sequence of phonetic symbols and tone mark(s). The document title area 510 can also updated to reflect the completed text entry of the word. The virtual keyboard in the text entry area can automatically switch to the primary key plane 430a and be ready to receive input symbols for the next Chinese character.

FIGS. 5A-5J illustrate an example for entering a Chinese character starting with an initial (onset) phonetic sound. To enter a Chinese character starting with a medial sound, a user can enter the appropriate medial phonetic symbol on the primary key plane 430a, after the virtual keyboard switches to the secondary key plane 430b, the user can proceed to enter the appropriate final phonetic symbol and the appropriate tone mark to complete the text entry for the Chinese character. To enter a Chinese character consisting of only a medial or a final sound, the user can manually invoke the shift key 406 on the primary key plane 430a and cause the second key plane 430b to be displayed in the virtual key board. The user can then proceed to enter the appropriate medial or final phonetic symbol on the secondary key plane 430b. After the medial or final phonetic symbol is entered on the secondary key plane 430b, the user can complete the text entry of the Chinese character by entering an appropriate tone mark on the secondary key plane 430b. After the tone mark is entered, the virtual keyboard can automatically switch from the secondary key plane 430b to the primary key plane 430a again.

FIGS. 6A-6B illustrate an example process for text input correction (e.g., deleting a previously entered phonetic symbol or tone mark) from the text input interface.

In FIG. 6A, the user has entered the complete "phonetic spelling" of the word "蘋果", which is "ㄆㄧㄥˊㄍㄨㄛˇ". The document title area 510, the text input box 520 both show the phonetic symbols that have been entered so far. The candidate suggestion list 530 includes the entry "蘋果." The virtual keyboard has switched back to the primary key plane 430a after the final tone mark "ˇ" was entered on the secondary key plane 430a. At this time, if the user wishes to make a correction, each of the previously entered phonetic symbols and tone marks can be deleted consecutively in a last-in-first-out fashion. When a user input directed toward the delete key 420 is received, the last-entered tone mark "ˇ" can be deleted, as reflected in the document title area 510 and the input text box 520. As soon as the final tone mark is deleted, the virtual keyboard can automatically switch from the primary key plane 430a back to the secondary key plane 430b, and be ready to receive a new entry of the tone mark, as shown in FIG. 6B. As symbols are deleted from the sequence of phonetic symbols, the list of suggested candidate characters can be updated to reflect the change.

In this example, only the deletion of a final tone mark is shown. Similar automatic switching from the secondary key plane 430b to the primary key plane 430a can also occur if the last-entered symbol is an initial phonetic symbol (or a medial phonetic symbol previously entered from the primary key plane), and the user deletes that initial phonetic symbol (or medial phonetic symbol) from the secondary key plane 430b.

In some implementations, a user can selectively delete a symbol at any particular position in the string of phonetic symbols and tone marks that are displayed in the text input box 530. In response to the deletion, the virtual keyboard can automatically switch to the alternative key plane or remain on the currently displayed key plane depending on the symbol that is deleted and its role in the "phonetic spelling" of the Chinese Characters. For example, if the user decides to delete the first tone mark "ˊ" in the string "ㄆㄧㄥˊㄍㄨㄛˇ", the virtual key board can automatically switch from the primary key plane to the secondary key plane for the user to enter a new tone mark. For another example, if the user deletes the medial "ㄨ", the secondary key plane can remain in the virtual keyboard, and be ready to receive a new medial input. However, if the user decides that no medial is necessary, the user can manually press the shift key 406 to switch to the primary key plane to enter a phonetic symbol for the next Chinese character input. As phonetic symbols are deleted from the sequence of phonetic symbols, the list of suggested candidate characters (or combinations of characters) can be updated accordingly to match the resulting new sequence of phonetic symbols.

In some implementations, addition or deletion of a phonetic symbol or tone mark that does not confirm to the "phonetic spelling" of any Chinese character will not trigger key plane switching in the virtual keyboard.

In some implementations, the user can select a Chinese character or word from the candidate suggestion list at any stage of the symbol input and complete the input of the Chinese character or word without completing the "phonetic spelling." If the user completes the input by choosing a suggested candidate, the virtual keyboard can display the primary key plane 430a and be ready to receive symbol input of the next Chinese character or word.

The capability to accept a sequence of phonetic symbols for multiple characters enables the presentation of candidate characters or candidate multi-character combinations that are more accurate. The user does not have to scan through a long list of candidate characters to select a single character after completely spelling out each single character. Multi-character combinations for multiple characters, words, phrases, partial sentences, and even complete sentences can be entered with a single selection. A user can continue to enter the phonetic symbols for multiple characters until the desired multi-character combination is presented in the list of suggested candidates on the display. The multi-character combination can include a single word, phrases, partial sentences, and even complete sentences. The suggested candidates can be based on the sequence of phonetic symbols that have been entered. For example, the phonetic spellings of the suggested candidates match the sequence of phonetic symbols that have been input so far. A dictionary or database of possible character combinations for single word, phrases, partial sentences, and sentences can be used for candidate suggestion. The dictionary can be updated through adaptive learning to include more and more possible character combinations and suggest these character combinations in the candidate list based on their frequency of use.

One possible variation of the Zhuyin input method described above is a "toneless" Zhuyin input method. The phonetic spelling of a Chinese character without an appropriate tone mark would correctly match a number of Chinese characters with the same pronunciation except for intonation. Combinations of Chinese characters can be represented by a sequence of phonetic symbols without the corresponding tone marks. The correct combination of characters that correspond to the sequence of phonetic symbols without the corresponding tone marks can be deduced and presented to the user on the text input user interface. For example, instead of entering eight symbols "ㄆ ㄧ ˊ ㄍ ㄨ ㄛ ˇ" for the word "蘋果" the sequence of six Zhuyin phonetic symbols "ㄆㄧㄥㄍㄨㄛ" without the tone marks can be used to enter the word "蘋果." The list of character combinations presented for this sequence of Zhuyin phonetic symbols (1) have pronunciations matching the sequence "ㄆㄧㄥㄍㄨㄛ" and at the same time (2) represent actual words, common phrases, idioms, or common sentences used in the Chinese language. Since character combinations that meet both criteria (1 and 2) are relatively few in number, there is little likelihood of ambiguity in candidate suggestion and text entry. The accuracy of the candidate suggestion improves as more Zhuyin symbols are correctly entered. In addition, as more phonetic symbols are entered as a sequence, more Chinese characters can be entered at the same time. The speed of text entry can be improved. The actual words, common phrases, idioms, or common sentences used in candidate suggestions can be stored in a dictionary or database on the device or over a network. The dictionary and database can be improved through adaptive learning using text entry of a large number of users. The dictionary and database can also be improved through adaptive learning to suit the text entry habit of particular users.

If the "toneless" Zhuyin input method is used, the automatic switching dual plane keyboard described above does not need to include keys for the tone marks. The automatic switching from the secondary key plane to the primary key plane can be configured to occur when the final phonetic symbol of each character is entered. For example, for the word "個人," (which means "individual" or "personal" in English), the toneless phonetic spelling is "ㄍㄜˋㄖㄣˊ." After the initial phonetic symbol "ㄍ" is entered, the keyboard can automatically switch from the first key plane to the second key plane. After the final phonetic symbol "ㄜ" is entered, the keyboard can automatically switch from the second key plane back to the first key plane. The phonetic spelling without tone mark for the character "個" is completed. No tone mark needs to be entered at this point, and the user can continue to enter the initial phonetic symbol for the next character "人." After the user enters the initial phonetic symbol "ㄖ," the keyboard can automatically switch from the first key plane to the second key plane. After the user enters the final phonetic symbol "ㄣ," the list of suggested character combinations displayed on the user interface includes the character combination "個人" with few or no other choices. The user can select the character combination "個人" to complete the character entry for the word.

In some implementations, the keyboard can still include the tone marks if the display has sufficient size. A user can choose to enter tone marks for some of the characters while leaving out the tone marks for others. Because the candidate suggestions are based on the sequence of phonetic symbols and tone mark(s) that have been entered, adding the tone marks for some of the phonetic spellings can disambiguate and further narrow down the list of possible character combinations quickly. The speed of character entry can be further improved.

In some implementations, if the automatic switching between key planes is set to be triggered on the entry of the final phonetic symbols, and occasional tone mark entry is enabled, the tone marks can be added to the first key plane, which includes the initial phonetic symbols. In cases where medial phonetic symbols are required for the spelling of a Chinese character, the user can manually switch to the keyboard to the appropriate key plane for input.

The toneless Zhuyin input method does not have to be implemented in conjunction with the automatic switching keyboard. Continued input of Zhuyin symbols for multiple characters can be entered on any Zhuyin keyboard, and a multi-character combination can be selected and entered from the list of character combinations suggested according to the sequence of phonetic symbols that has been entered using the keyboard.

Another variation of the Zhuyin input method described above is an "abbreviated" Zhuyin input method. Using the "abbreviated" Zhuyin input method, only the initial phonetic symbols of characters are required. For example, to enter the word "個人," the complete phonetic spelling would include six symbols "ㄍㄜˋㄖㄣˊ." Using the "abbreviated" Zhuyin input method, only the two initial phonetic symbols "ㄍ" and "ㄖ" need to be entered on the keyboard. Once these two initial phonetic symbols are entered on the keyboard, a list of candidate two-character combinations can be presented to the user. The list would include most or all two-character combinations whose phonetic spellings include a sequence of initial phonetic symbols matching the sequence of initial phonetic symbols currently entered. Using the abbreviated Zhuyin input method, only one symbol is required for each character. The disambiguation of character-combinations can be improved as more initial phonetic symbols are being entered. In some implementations, occasional tone marks or final phonetic symbols can be entered in the sequence to help further narrow down the list of candidate character combinations.

In some implementations, if the "abbreviated" Zhuyin input method is used, only the first key plane is presented for user input. The first key plane can include only the set of initial phonetic symbols of the Zhuyin alphabet. In some implementations, the first key plane can further include the set of medial phonetic symbols since phonetic spellings of some characters start with a medial phonetic symbol. In some implementations, the first key plane can further include the set of tone marks. A user can enter a tone marks after some of the phonetic symbols to help narrow down the list of possible character candidates.

In some implementations, if the "abbreviated" Zhuyin input method is used, the automatic switching between the dual plane keyboard can be disabled. For example, only the first key plane that includes the initial phonetic symbols is presented on the user interface. The user can manually switch to the second key plane with the final phonetic symbols if the user wishes to input the final phonetic symbols in the sequence for some of the characters to be entered. By using the "abbreviated" Zhuyin input method, only a partial set of the Zhuyin phonetic symbols (the initial phonetic symbols) needs to be displayed on the screen. This allows more space for content to be displayed on the screen. In addition, since only one symbol is required for each character, the character input speed can be improved. "Abbreviated" Zhuyin input method is particularly helpful for entering idioms and common phrases with multiple characters.

In some implementations, the continued entry of a sequence of phonetic symbols for multiple Chinese characters can be implemented independent of the auto-switching keyboard. Any keyboard for Zhuyin symbol input can be used. In some implementations, tone marks are not required in the continued entry of a sequence of phonetic symbols for multiple Chinese characters. In some implementations, final and/or medial phonetic symbols are not required in the continued entry of a sequence of phonetic symbols for multiple Chinese characters. The suggested single or multi-character combinations can be presented according to the sequence of phonetic symbols (and tone marks, if any) that have been entered. For example, the matching between the sequence of phonetic symbols (and tone marks, if any) and the complete phonetic spellings of character combinations can be implemented using regular expression, sub-string, and/or token matching techniques typical of any character strings.

Figure 7:
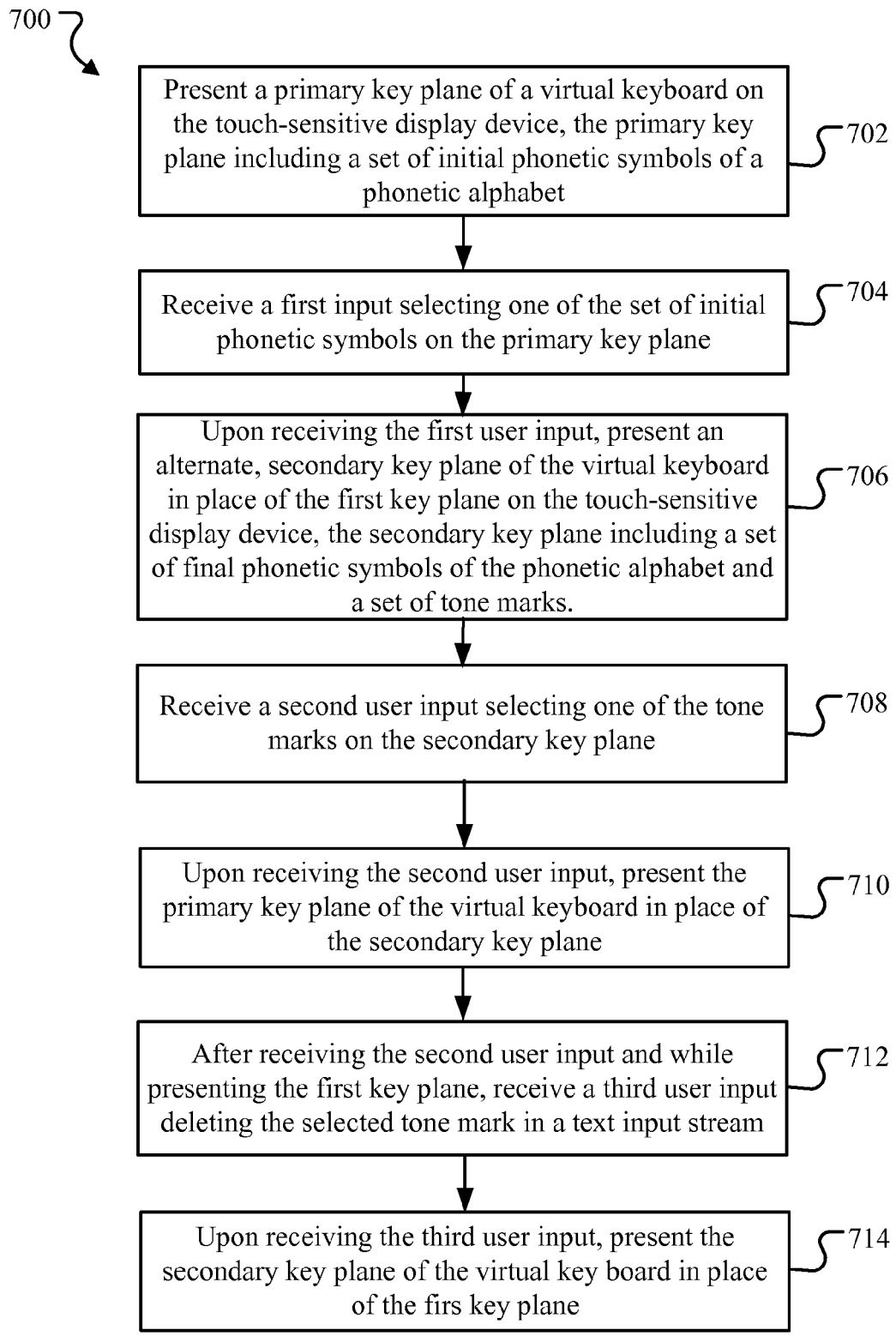
FIG. 7 is a flow diagram of an example process for entering text and input correction.

FIG. 7 is a flow diagram of an example process 700 for entering text. A first key plane of a virtual keyboard can be presented, where the first key plane includes a set of initial phonetic symbols of a phonetic alphabet (702). In some implementations, the first key plane can also include a set of medial phonetic symbols of the phonetic alphabet. A first input selecting one of the set of initial phonetic symbols on the first key plane can be received (704). Upon the first user input being received, an alternate, second key plane of the virtual keyboard can be presented in place of the first key plane. The second key plane can include a set of final phonetic symbols of the phonetic alphabet and a set of tone marks associated with the phonetic alphabet (706).

In some implementations, a first input selecting one of the set of medial phonetic symbols on the first key plane can also trigger the switching from the first key plane to the second key plane. In some implementations, the second key plane can also include the set of medial phonetic symbols. However, in some implementations, the second key plane does not include any initial phonetic symbols of the phonetic alphabet. A user can select a medial and/or final phonetic symbol on the second key plane to spell the desired Chinese character input, and then input a tone mark to complete the "phonetic spelling" of the Chinese character input.

Following the input of a medial or final phonetic symbol, a second user input selecting one of the tone marks on the second key plane can be received (708). Upon the second user input being received, the first key plane of the virtual keyboard can be presented in place of the second key plane (710). The virtual keyboard can be ready to receive the symbol for the next input character.

However, instead of proceeding with the input of the next character, a user can make a correction of previously entered symbols or tone marks. For example, after the second user input is received and while the first key plane is being presented, a third user input deleting the selected tone mark can be received (712). Upon the third user input being received, the second key plane of the virtual key board can be presented in place of the first key plane (714).

Figure 8:
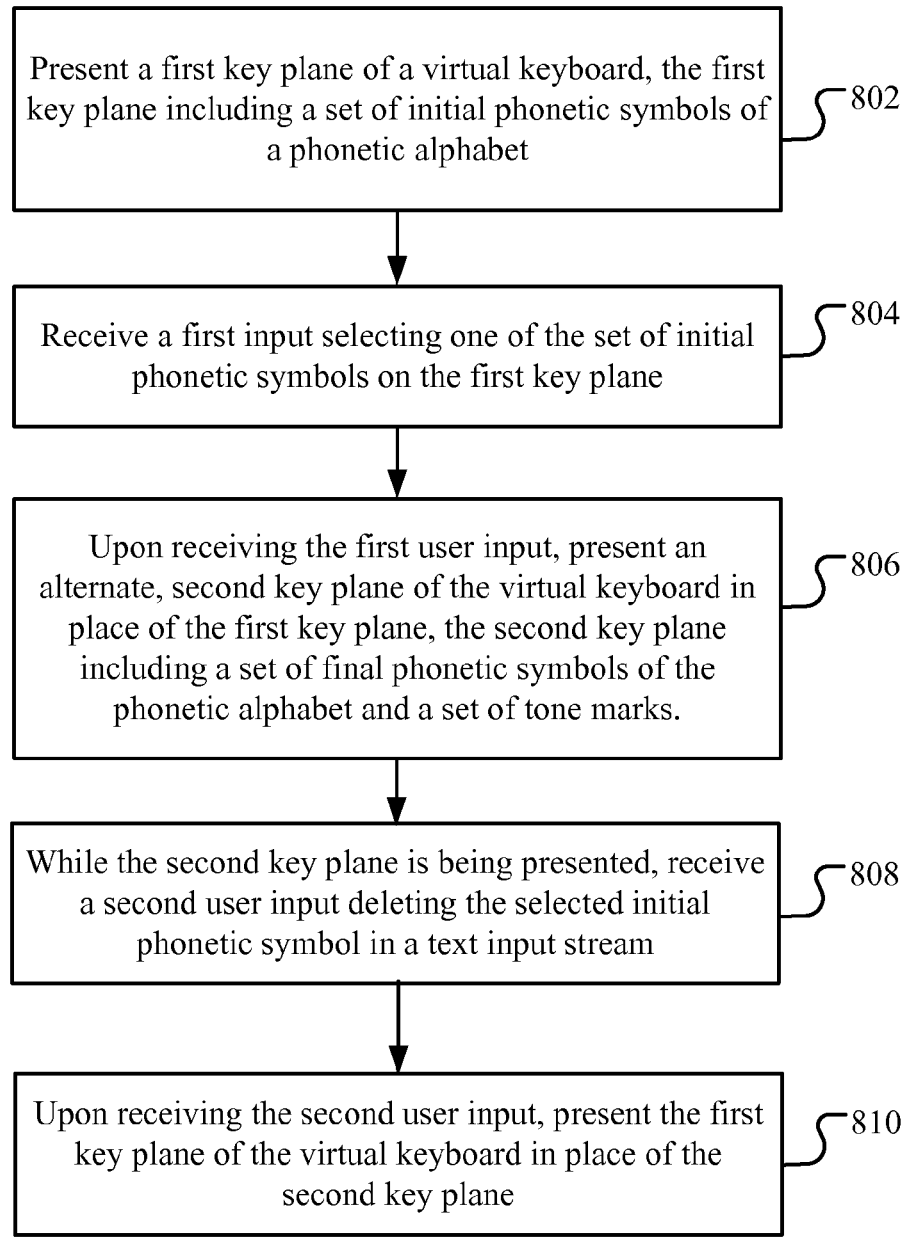
FIG. 8 is a flow diagram of another example process for entering text and input correction.

FIG. 8 shows another example process for text entry and input correction. For example, a first key plane of a virtual keyboard can be presented, where the first key plane includes a set of initial phonetic symbols of a phonetic alphabet (802). A first input selecting one of the set of initial phonetic symbols can be received on the first key plane (804). Upon receiving the first user input, an alternate, second key plane of the virtual keyboard can be presented in place of the first key plane, where the second key plane includes a set of final phonetic symbols of the phonetic alphabet and a set of tone marks (806). While the second key plane is being presented, a second user input deleting the selected initial phonetic symbol in a text input stream can be received (808). Upon the second user input being received, the first key plane of the virtual keyboard can be presented in place of the second key plane (810).

Figure 9:
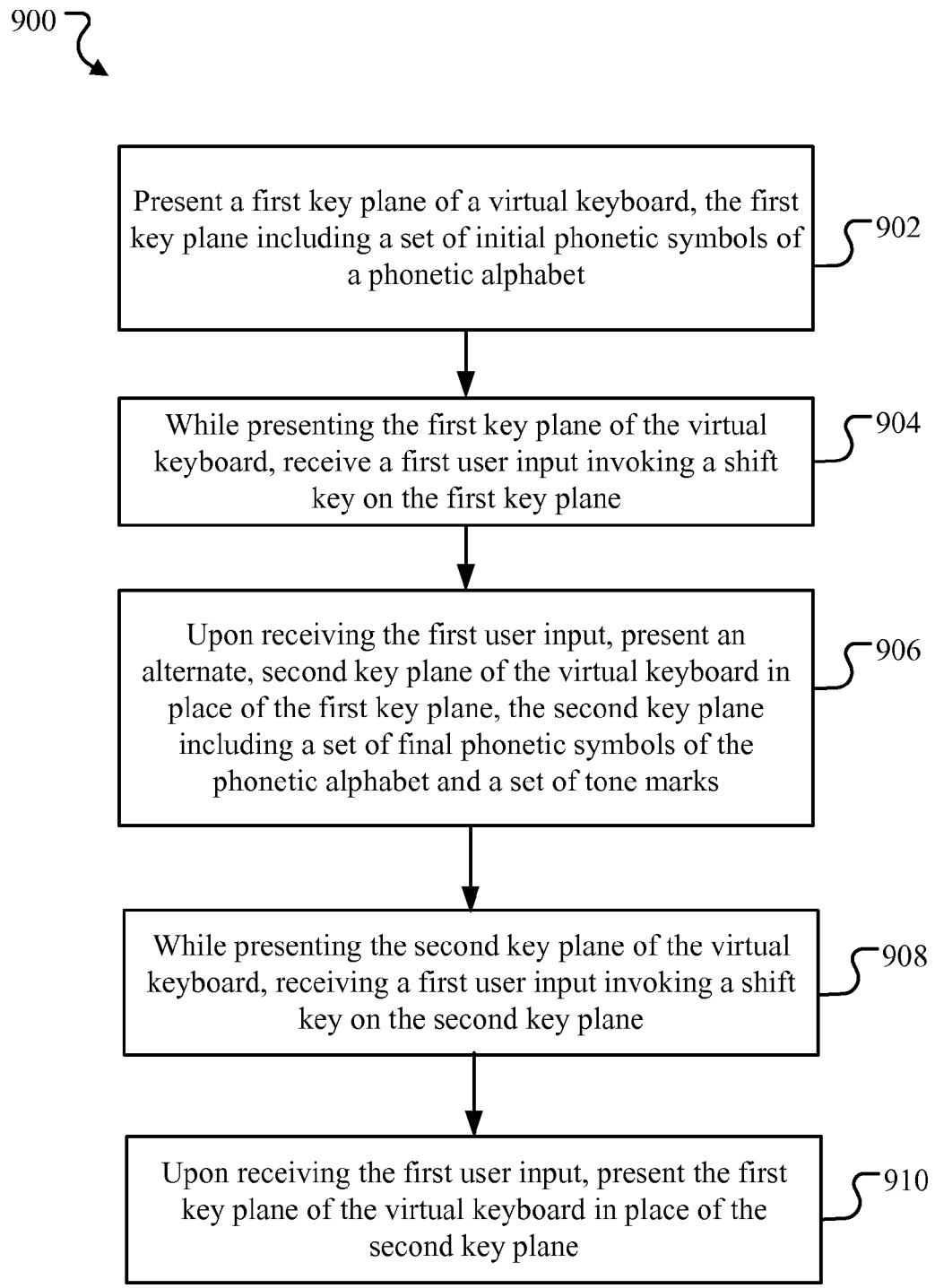
FIG. 9 is a flow diagram of an example process for manually switching between alternate key planes.

FIG. 9 is a flow diagram of an example process for manually switching between the two key planes of the text input interface. A first key plane of a virtual keyboard can be presented, where the first key plane includes a set of initial phonetic symbols of a phonetic alphabet (902). While the first key plane of the virtual keyboard is presented, a first user input invoking a shift key on the first key plane can be received (904). Upon the first user input being received, an alternate, second key plane of the virtual keyboard can be presented in place of the first key plane, where the second key plane includes a set of final phonetic symbols of the phonetic alphabet and a set of tone marks (906). While the second key plane of the virtual keyboard is presented, a first user input invoking the shift key on the second key plane can be received (908). Upon the first user input being received, the first key plane of the virtual keyboard can be presented in place of the second key plane (910).

Figure 10:
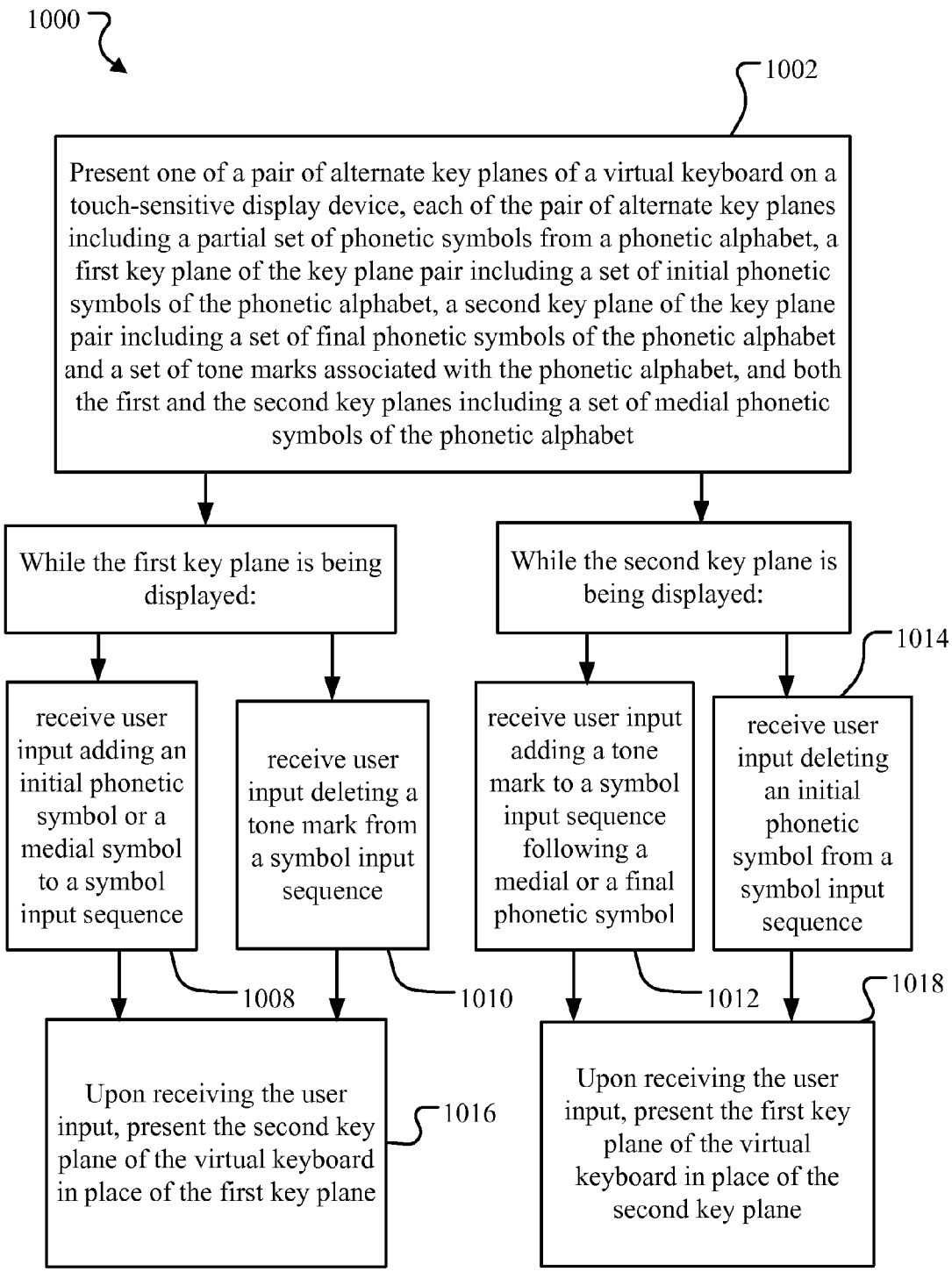
FIG. 10 is a flow diagram of an example process for automatically switching between alternate key planes.

FIG. 10 is a flow diagram of an example process for automatic switching of key planes in the virtual keyboard. First, one of a pair of alternate key planes of a virtual keyboard can be presented (1002). Each of the pair of alternate key planes can include a partial set of phonetic symbols from a phonetic alphabet. A first key plane of the key plane pair can include a set of initial phonetic symbols of the phonetic alphabet. A second key plane of the key plane pair can include a set of final phonetic symbols of the phonetic alphabet and a set of tone marks associated with the phonetic alphabet. Both the first and the second key planes can include a set of medial phonetic symbols of the phonetic alphabet.

While the first key plane is being displayed, a user input adding an initial phonetic symbol or a medial phonetic symbol to a text input stream can be received (1008). Upon the user input being received, the second key plane of the virtual keyboard can be presented in place of the first key plane (1016).

Alternatively, while the first key plane is being displayed, user input deleting a tone mark from a text input stream can be received (1010). Upon receiving the user input, the second key plane of the virtual keyboard can be presented in place of the first key plane (1016).

Alternatively, while the second key plane is being displayed, user input adding a tone mark to a text input stream following a medial or a final phonetic symbol can be received (1012). Upon the user input being received, the first key plane of the virtual keyboard can be presented in place of the second key plane (1018).

Alternatively, while the second key plane is being displayed, user input deleting an initial phonetic symbol from a text input stream can be received (1014). Upon receiving the user input, the first key plane of the virtual keyboard can be presented in place of the second key plane (1018).

It should be appreciated that while the implementations above are described with respect to entry of Chinese language text using the Zhuyin input method, the above-described implementations can be adapted for use with other languages and other input methods.

Figure 11:
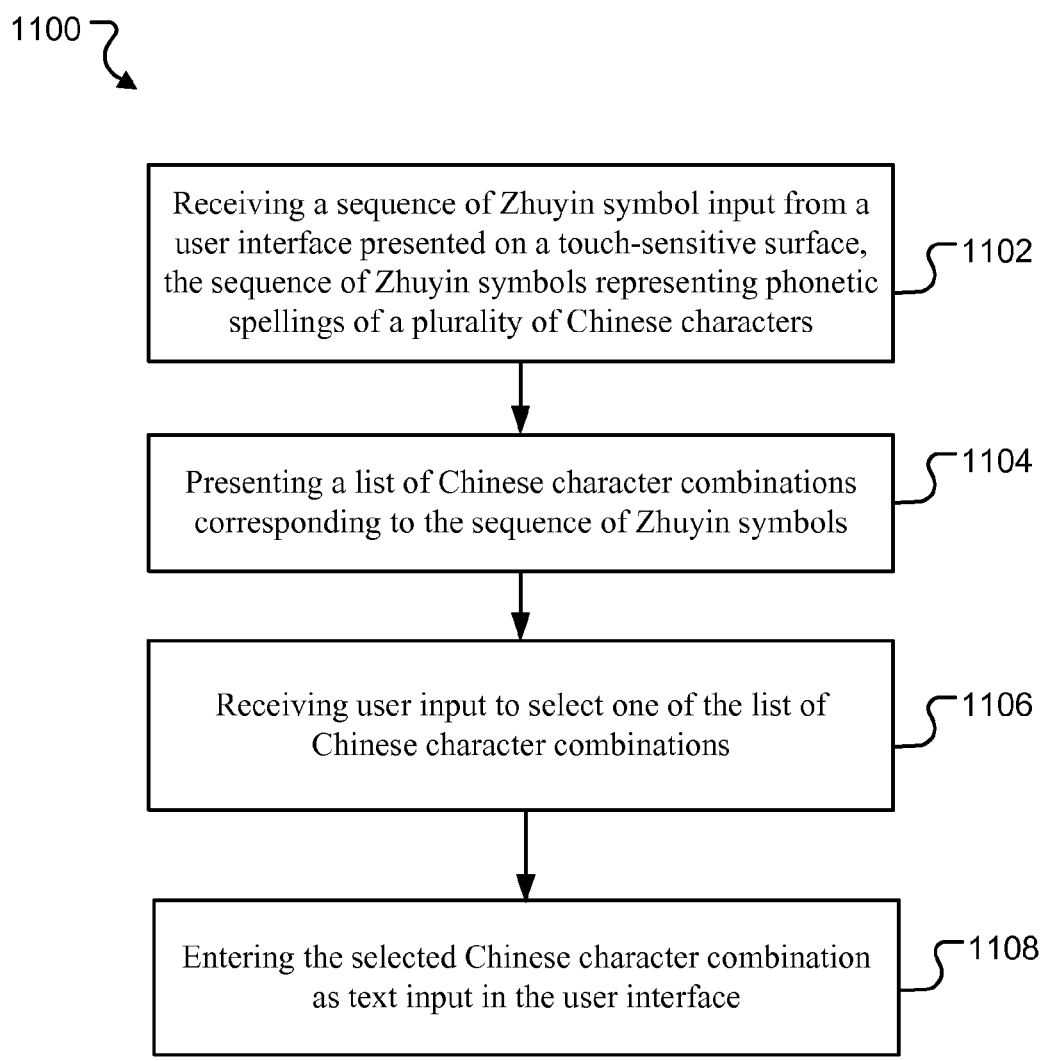
FIG. 11 is a flow diagram of an example process for entering a sequence of Zhuyin phonetic symbols for multiple characters before an entry of a multi-character combination is completed.

FIG. 11 is an example process 1100 for entering a sequence of Zhuyin symbols for multiple Chinese characters before a multi-character combination is entered. The process can be implemented on a touch-sensitive display or surface. The process can start when a sequence of Zhuyin symbol input are received from a user interface, where the sequence of Zhuyin symbols (including tone marks) represents phonetic spellings of a plurality of Chinese characters (1102). A list of Chinese character combinations can be presented corresponding to the sequence of Zhuyin phonetic symbols and tone marks (1104). User input to select one of the list of Chinese character combinations can be received (1106). The selected Chinese character combination can be entered as text input in the user interface (1108).

In some implementations, the sequence of Zhuyin symbols can represent phonetic spellings of the plurality of Chinese characters without corresponding tone marks for all of the plurality of Chinese characters. In some implementations, the sequence of Zhuyin symbols can represent phonetic spellings of the plurality of Chinese characters without any corresponding tone marks for any of the plurality of Chinese characters. In some implementations, the sequence of Zhuyin symbols can represent phonetic spellings of the plurality of Chinese characters without corresponding final phonetic symbols for all of the plurality of Chinese characters. In some implementations, the sequence of Zhuyin symbols can represent phonetic spellings of the plurality of Chinese characters without any corresponding final phonetic symbols for any of the plurality of Chinese characters.

Figure 12:
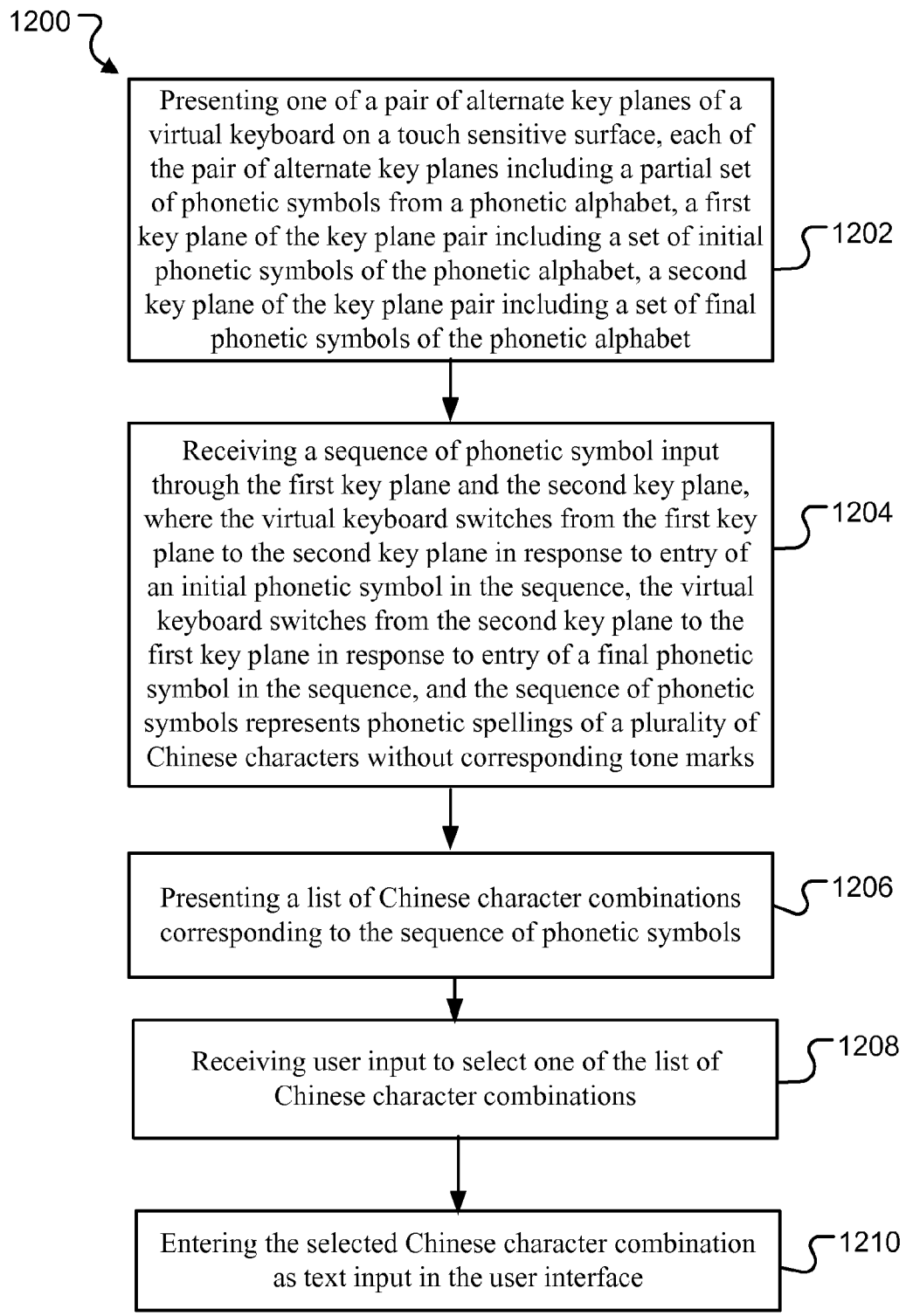
FIG. 12 is a flow diagram of an example process for entering multi-character combinations on an auto-switching keyboard using a toneless Zhuyin input method.

FIG. 12 is the flow chart of an example process 1200 for receiving text-input on a touch-sensitive display device using the "toneless" Zhuyin input method. One of a pair of alternate key planes of a virtual keyboard can be presented (1202). Each of the pair of alternate key planes can include a partial set of phonetic symbols from a phonetic alphabet. A first key plane of the key plane pair can include a set of initial phonetic symbols of the phonetic alphabet. A second key plane of the key plane pair can include a set of final phonetic symbols of the phonetic alphabet; A sequence of Zhuyin symbols can be received through the first key plane and the second key plane (1204), where the virtual keyboard switches from the first key plane to the second key plane in response to entry of an initial phonetic symbol in the sequence, the virtual keyboard switches from the second key plane to the first key plane in response to entry of a final phonetic symbol in the sequence, and the sequence of Zhuyin symbols represents phonetic spellings of a plurality of Chinese characters without corresponding tone marks. A list of Chinese character combinations corresponding to the sequence of Zhuyin symbols can be presented (1206). User input to select one of the list of Chinese character combinations can be received (1208). The selected Chinese character combination can be entered as text input in the user interface (1210).

Figure 13:
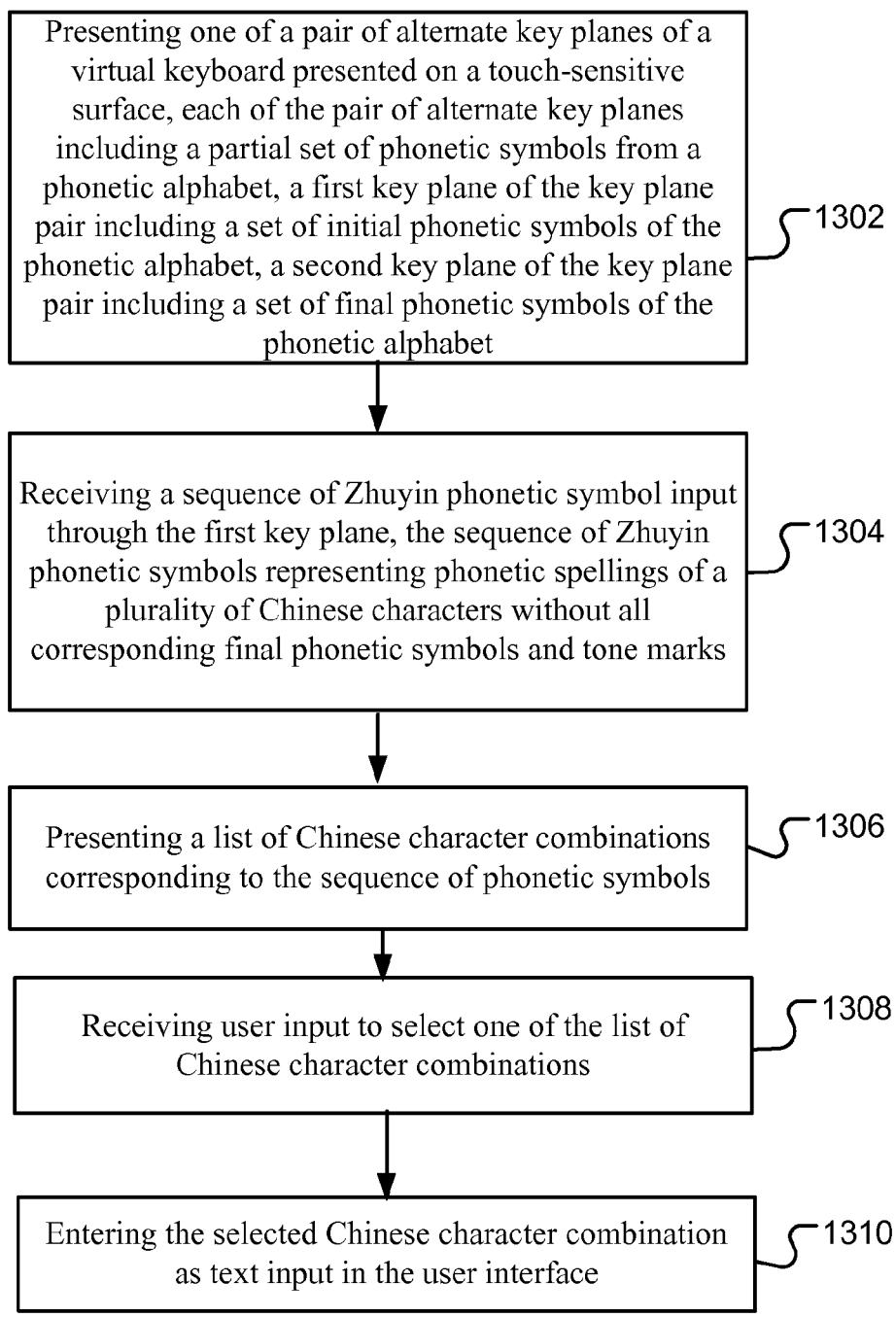
FIG. 13 is a flow diagram of an example process for entering multi-character combinations on a dual-plane keyboard using an "abbreviated" Zhuyin input method.

FIG. 13 is a flow diagram of an example process 1300 for receiving text-input on a touch-sensitive display device or surface using the "abbreviated" Zhuyin input method. One of a pair of alternate key planes of a virtual keyboard can be presented (1302). Each of the pair of alternate key planes can include a partial set of phonetic symbols from a phonetic alphabet. A first key plane of the key plane pair can include a set of initial phonetic symbols of the phonetic alphabet. A second key plane of the key plane pair can include a set of final phonetic symbols of the phonetic alphabet. A sequence of Zhuyin symbols is received through the first key plane (1304). The sequence of Zhuyin symbols represents phonetic spellings of a plurality of Chinese characters without corresponding final phonetic symbols and tone marks. A list of Chinese character combinations corresponding to the sequence of Zhuyin symbols can be presented (1306). User input to select one of the list of Chinese character combinations can be received (1308). The selected Chinese character combination can be entered as text input in the user interface (1310).

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An interface for entering electronic text on a touch-sensitive display device, comprising:
a virtual keyboard that includes a first key plane and a second, alternate key plane that replaces display of the first key plane, wherein:
the first key plane comprises a set of initial phonetic symbols of a single phonetic alphabet;
the second key plane comprises a set of final phonetic symbols of the single phonetic alphabet;
the first key plane and the second key plane are touch-sensitive and operable to receive user input directed toward each of the phonetic symbols to generate electronic text input; and
the virtual keyboard switches between displaying the first key plane and displaying the second key plane in response to predetermined user input triggers received through the virtual keyboard.

2. The interface of claim 1, wherein the first key plane further includes a set of medial phonetic symbols of the phonetic alphabet.

3. The interface of claim 1, wherein the second key plane further includes a set of medial phonetic symbols of the phonetic alphabet.

4. The interface of claim 1, wherein the first and the second key planes include a set of identical medial phonetic symbols of the phonetic alphabet.

5. The interface of claim 1, wherein the phonetic symbols are Zhuyin symbols of a Chinese Zhuyin alphabet and are arranged in horizontal rows on the first and the second key planes in predetermined phonetic groups of the Chinese Zhuyin alphabet.

6. The interface of claim 1, wherein the first and the second key planes each include a shift key for switching between displaying the first key plane and displaying the second key plane.

7. The interface of claim 1, wherein the predetermined user input triggers include user selecting one of the set of initial phonetic symbols of the phonetic alphabet on the first key plane.

8. The interface of claim 1, wherein the second key plane further includes a set of tone marks associated with the phonetic alphabet.

9. The interface of claim 8, wherein the predetermined user input triggers include user selecting one of the set of tone marks associated with the phonetic alphabet on the second key plane.

10. The interface of claim 9, wherein the predetermined user input triggers include user deleting a last-entered tone mark in a text input stream while the first key plane is being presented.

11. The interface of claim 1, wherein the predetermined user input triggers include user deleting a last-entered initial phonetic symbol in a text input stream while the second key plane is being presented.

12. The interface of claim 1, wherein the predetermined user input triggers include user selecting a shift key on the first or the second key plane that is operable to trigger key plane switching in the virtual keyboard between the first and the second key planes.

13. The interface of claim 1, wherein the second key plane displays a predetermined set of final phonetic symbols, independent of the initial phonetic symbol selected in the first key plane.

14. A computer-implemented method for receiving text-input on a touch-sensitive display device, comprising:
presenting a primary key plane of a virtual keyboard on the touch-sensitive display device, the primary key plane including a set of initial phonetic symbols of a phonetic alphabet and none of a set of final phonetic symbols of the phonetic alphabet;
receiving a first user input selecting one of the set of initial phonetic symbols on the primary key plane; and
upon receiving the first user input, presenting an alternate, secondary key plane of the virtual keyboard in place of the primary key plane on the touch-sensitive display device, the secondary key plane including a set of final phonetic symbols of the phonetic alphabet and none of the set of initial phonetic symbols of the phonetic alphabet.

15. The method of claim 14, wherein the primary key plane further includes a set of medial phonetic symbols of the phonetic alphabet.

16. The method of claim 14, wherein the secondary key plane further includes a set of tone marks associated with the phonetic alphabet.

17. The method of claim 16, further comprising:
receiving a second user input selecting one of the set of tone marks on the secondary key plane; and
upon receiving the secondary user input, presenting the primary key plane of the virtual keyboard in place of the secondary key plane.

18. The method of claim 17, further comprising:
after receiving the second user input and while presenting the primary key plane, receiving a third user input deleting the selected tone mark; and
upon receiving the third user input, presenting the secondary key plane of the virtual key board in place of the primary key plane.

19. The method of claim 14, wherein the primary and the secondary key planes each further includes an identical set of medial phonetic symbols of the phonetic alphabet.

20. The method of claim 14, wherein the phonetic symbols are Zhuyin symbols of a Chinese Zhuyin alphabet and are arranged in horizontal rows on the primary and the secondary key planes in predetermined phonetic groups of the Chinese Zhuyin alphabet.

21. The method of claim 14, wherein the primary and the secondary key planes each includes a shift key that is operable to trigger key plane switching in the virtual keyboard between the primary and the secondary key planes when invoked by user input.

22. The method of claim 21, further comprising:
while presenting the primary key plane of the virtual keyboard, receiving a second user input invoking the shift key on the primary key plane; and
upon receiving the second user input, presenting the secondary key plane of the virtual keyboard in place of the primary key plane.

23. The method of claim 21, further comprising:
while presenting the secondary key plane of the virtual keyboard, receiving a second user input invoking the shift key on the secondary key plane; and
upon receiving the second user input, presenting the primary key plane of the virtual keyboard in place of the secondary key plane.

24. The method of claim 14, further comprising:
while presenting the secondary key plane, receiving a second user input deleting the selected initial phonetic symbol; and
upon receiving the second user input, presenting the primary key plane of the virtual keyboard in place of the secondary key plane.

25. The method of claim 14, wherein the secondary key plane displays a predetermined set of final phonetic symbols, independent of the initial phonetic symbol selected in the primary key plane.

26. A computer-implemented method for receiving text-input on a touch-sensitive display device, comprising:
presenting one of a pair of alternately displayed key planes of a virtual keyboard on the touch-sensitive display device, each of the pair of alternate key planes including a partial set of phonetic symbols from a phonetic alphabet, a first key plane of the key plane pair including a set of initial phonetic symbols of the phonetic alphabet, and a second key plane of the key plane pair including a set of final phonetic symbols of the phonetic alphabet; and
receiving a sequence of symbol input from the pair of alternate key planes for text entry on the touch-sensitive display device.

27. The method of claim 26, wherein the second key plane further includes a set of tone marks associated with the phonetic alphabet.

28. The method of claim 27, wherein both the first and the second key planes include a set of medial phonetic symbols of the phonetic alphabet.

29. The method of claim 28, further comprising:
while the first key plane is being presented, receiving user input adding an initial phonetic symbol or a medial symbol to a symbol input sequence; and
upon receiving the user input, presenting the second key plane of the virtual keyboard in place of the first key plane.

30. The method of claim 28, further comprising:
while the first key plane is being presented, receiving user input deleting a tone mark from a symbol input sequence; and
upon receiving the user input, presenting the second key plane of the virtual keyboard in place of the first key plane.

31. The method of claim 28, further comprising:
while the second key plane is being presented, receiving user input adding a tone mark to a symbol input sequence following a medial or a final phonetic symbol; and
upon receiving the user input, presenting the first key plane of the virtual keyboard in place of the second key plane.

32. The method of claim 28, further comprising:
while the second key plane is being presented, receiving user input deleting an initial phonetic symbol from a symbol input sequence; and
upon receiving the user input, presenting the first key plane of the virtual keyboard in place of the second key plane.

33. The method of claim 26, wherein the second key plane displays a predetermined set of final phonetic symbols, independent of the initial phonetic symbol selected in the first key plane.

34. A portable device comprising:
a touch-sensitive display or surface;
memory;
one or more processors; and
instructions stored in the memory and configured for execution by the one or more processors, the instructions comprising instructions to:
present one of a pair of alternately displayed key planes of a virtual keyboard, each of the pair of alternate key planes including a partial set of phonetic symbols from a phonetic alphabet, a first key plane of the key plane pair including a set of initial phonetic symbols of the phonetic alphabet, a second key plane of the key plane pair including a set of final phonetic symbols of the phonetic alphabet and a set of tone marks associated with the phonetic alphabet, and both the first and the second key planes including a set of medial phonetic symbols of the phonetic alphabet.

35. The device of claim 34, wherein the second key plane displays a predetermined set of final phonetic symbols, independent of the initial phonetic symbol selected in the first key plane.

36. A non-transitory computer-readable medium having instructions stored thereon, which, when executed by at least one processors, causes the processor to perform operations comprising:
presenting one of a pair of alternately displayed key planes of a virtual keyboard, each of the pair of alternate key planes including a partial set of phonetic symbols from a phonetic alphabet, a first key plane of the key plane pair including a set of initial phonetic symbols of the phonetic alphabet, a second key plane of the key plane pair including a set of final phonetic symbols of the phonetic alphabet and a set of tone marks associated with the phonetic alphabet, and both the first and the second key planes including a set of medial phonetic symbols of the phonetic alphabet.

37. The computer-readable medium of claim 36, wherein the second key plane displays a predetermined set of final phonetic symbols, independent of the initial phonetic symbol selected in the first key plane.

38. A computer-implemented method for receiving text-input, comprising:
  presenting one of a pair of alternately displayed key planes of a virtual keyboard on a touch sensitive surface, each of the pair of alternate key planes including a partial set of phonetic symbols from a phonetic alphabet, a first key plane of the key plane pair including a set of initial phonetic symbols of the phonetic alphabet, a second key plane of the key plane pair including a set of final phonetic symbols of the phonetic alphabet;
  receiving a sequence of phonetic symbol input through the first key plane and the second key plane, where the virtual keyboard switches from displaying the first key plane to displaying the second key plane in response to entry of an initial phonetic symbol in the sequence, the virtual keyboard switches from displaying the second key plane to displaying the first key plane in response to entry of a final phonetic symbol in the sequence, and the sequence of phonetic symbols represents phonetic spellings of a plurality of Chinese characters without corresponding tone marks;
  presenting a list of Chinese character combinations corresponding to the sequence of phonetic symbols;
  receiving user input to select one of the list of Chinese character combinations; and
  entering the selected Chinese character combination as text input in the user interface.

39. The method of claim 38, wherein the second key plane displays a predetermined set of final phonetic symbols, independent of the initial phonetic symbol selected in the first key plane.

40. A computer-implemented method for receiving text-input, comprising:
  presenting one of a pair of alternately displayed key planes of a virtual keyboard on a touch-sensitive surface, each of the pair of alternate key planes including a partial set of phonetic symbols from a phonetic alphabet, a first key plane of the key plane pair including a set of initial phonetic symbols of the phonetic alphabet, a second key plane of the key plane pair including a set of final phonetic symbols of the phonetic alphabet;
  receiving a sequence of phonetic symbols through the first key plane, the sequence of phonetic symbols representing phonetic spellings of a plurality of Chinese characters without all corresponding final phonetic symbols and tone marks;
  presenting a list of Chinese character combinations corresponding to the sequence of phonetic symbols;
  receiving user input to select one of the list of Chinese character combinations; and
  entering the selected Chinese character combination as text input in the user interface.

41. The method of claim 40, wherein the second key plane displays a predetermined set of final phonetic symbols, independent of the initial phonetic symbol selected in the first key plane.

* * * * *